US011247760B2

(12) United States Patent
Hall

(10) Patent No.: US 11,247,760 B2
(45) Date of Patent: Feb. 15, 2022

(54) MAGNET-ASSISTED AUTOMATIC LOCKING MECHANISMS

(71) Applicant: Eric R. D. Hall, Bristol, RI (US)

(72) Inventor: Eric R. D. Hall, Bristol, RI (US)

( * ) Notice: Subject to any disclaimer, the term of this patent is extended or adjusted under 35 U.S.C. 154(b) by 80 days.

(21) Appl. No.: 16/763,822

(22) PCT Filed: Nov. 13, 2018

(86) PCT No.: PCT/US2018/060721
§ 371 (c)(1),
(2) Date: May 13, 2020

(87) PCT Pub. No.: WO2019/094924
PCT Pub. Date: May 16, 2019

(65) Prior Publication Data
US 2020/0385096 A1 Dec. 10, 2020

Related U.S. Application Data

(60) Provisional application No. 62/585,175, filed on Nov. 13, 2017.

(51) Int. Cl.
*B63H 9/10* (2006.01)
*B63B 21/08* (2006.01)
(Continued)

(52) U.S. Cl.
CPC ............ *B63H 9/10* (2013.01); *B63B 21/08* (2013.01); *B63H 2009/086* (2013.01);
(Continued)

(58) Field of Classification Search
CPC ......... B63B 21/02; B63B 21/04; B63B 21/08; B63B 21/10; B63B 21/14; B63B 21/20; B63H 9/08; B63H 9/10; F16G 11/04
(Continued)

(56) References Cited

U.S. PATENT DOCUMENTS 4,077,347 A * 3/1978 Arce .................. B63H 9/08
114/108
4,465,011 A * 8/1984 Merry .................. B63B 21/08
114/199
(Continued)

OTHER PUBLICATIONS

International Search Report dated Jan. 16, 2019 in corresponding PCT Application No. PCT/US2018/060721.
(Continued)

*Primary Examiner* — Daniel V Venne
(74) *Attorney, Agent, or Firm* — Mintz Levin Cohn Ferris Glovsky and Popeo, P.C.; Steven M. Jensen

(57) ABSTRACT

Magnet-assisted automatic locking mechanisms for use on a sailboat are disclosed herein. One such mechanism includes: a housing having an internal space and configured to receive a slug that moves along a path through the housing, the slug being operably connected to the halyard, the housing including a first housing side and a second housing side coupled to one another; first and second flippers rotatably disposed in the housing, the first and second flippers configured to rotate between at least a cocked position in which the slug is inserted into the housing, a locked position in which a surface of the first and second flippers receive the slug and impede the slug from exiting the housing along the path, wherein the halyard is tensioned in the locked position, and a neutral position in which the first and second flippers allow movement of the slug; and a magnet assembly configured to effect rotation of the first and second flippers.

20 Claims, 51 Drawing Sheets

(51) Int. Cl.
*B63H 9/08* (2006.01)
*F16G 11/04* (2006.01)
*F16G 11/10* (2006.01)

(52) U.S. Cl.
CPC ........ *B63H 2009/088* (2013.01); *F16G 11/04* (2013.01); *F16G 11/10* (2013.01)

(58) Field of Classification Search
USPC ........ 114/102.1, 102.19, 104, 106, 108, 109, 114/111–115
See application file for complete search history.

(56) References Cited

U.S. PATENT DOCUMENTS

| | | | |
|---|---|---|---|
| 4,644,617 | A | 2/1987 | Tupper et al. |
| 6,443,082 | B1 * | 9/2002 | Lindstrom .......... B63B 15/0083 114/102.18 |
| 8,851,003 | B2 * | 10/2014 | Hall ....................... F16G 11/04 114/218 |
| 9,421,618 | B1 | 8/2016 | Brennan et al. |
| 2005/0205852 | A1 | 9/2005 | Stone et al. |
| 2009/0151138 | A1 | 6/2009 | Beilstein |
| 2011/0283928 | A1 | 11/2011 | Hall et al. |

OTHER PUBLICATIONS

Written Opinion of the International Searching Authority dated Jan. 16, 2019 in corresponding PCT Application No. PCT/US2018/060721.

* cited by examiner

MAGNET-ASSISTED AUTOMATIC LOCKING MECHANISMS

CROSS-REFERENCE TO RELATED APPLICATION

This application is a U.S. national phase application, pursuant to 35 U.S.C. § 371, of PCT/US2018/060721, filed Nov. 13, 2018, designating the United States, which claims the benefit of priority to U.S. Provisional Patent Application No. 62/585,175, filed in the United States Patent and Trademark Office on Nov. 13, 2017, the entire contents and disclosures of which are incorporated herein by this reference.

TECHNICAL FIELD

The present disclosure relates generally to locking mechanisms for use on a sailboat, and more particularly, to magnet-assisted automatic locking mechanisms for use on a sailboat.

BACKGROUND

Sailboat sails are hoisted by ropes called halyards. Conventionally, halyards were made of steel cable, for example, stainless steel, galvanized plow steel, or the like. These steel halyards generally were strong and had little or no stretch/strain over time. With the advent of high strength synthetic polymer fibers, such as Dyneema/Spectra, Vectran, or PBO (poly-p-phenylenebenzobisoxazole), halyards weighing about 25% of the weight of steel halyards with equal strength and stretch of steel halyards were developed. Today, these lightweight high strength ropes make up almost all of sailboat halyards.

Synthetic-based halyards, however, typically suffer from a disadvantage of "creep," which is not found in steel halyards. Creep is the property of a material whereby it gradually strains and elongates under constant load. When a halyard slowly strains, the tension in the halyard decreases and sail trim is affected, such that the halyard must be regularly readjusted to maintain optimal sail trim. Especially on racing boats, consistent and accurate halyard tension is an important property. For non-racing boats, the slowly straining halyards can cause the sail to slowly develop wrinkles as tension eases, making for an unsightly sail, which can compromise the perceived beauty of a sailing pleasure yacht.

To combat this problem, halyard locks are regularly installed at the top of masts, so that creep can be avoided. Traditionally, a halyard lock includes a hook that latches to a ball-like fitting on the halyard. This latch generally latches like a door latch. To unlock the lock, the sail is tensioned to relieve the load on the lock. Then, at deck level, a small diameter rope, or "tripline," that runs either inside the mast or outside along the sail and attached to the latch is tensioned, releasing the sail. Since the masthead is typically too tall to be visible from the deck level, it is sometimes difficult to determine if the lock is locked, partially locked, or not locked at all. Often a crew member is sent aloft to confirm that the halyard is locked. Also, the use of multiple triplines can be problematic since, for example, they can jam inside the mast, break, or make lock servicing difficult, and may require an additional crew member to operate.

It would therefore be desirable to provide a halyard lock that does not require a tripline. It would also be desirable to provide a halyard lock that allows a single crew member to raise and lock a halyard hoisting a sail and to unlock and lower the same.

SUMMARY OF THE DISCLOSURE

The present disclosure provides magnet-assisted automatic locking mechanisms for maintaining tension on a halyard in which a magnet assembly controls the operation of components of the locking mechanisms through forces of magnetic attraction and repulsion. The locking mechanisms described herein can operate without an attendant tripline and eliminate the need for manual inspection to determine if the lock is locked. To lock a halyard, the halyard can be hoisted against an end stop, thereby enabling the halyard to engage the lock. To release the halyard from a locked condition, the halyard can again be hoisted against its stop to release tension. Due to its configuration, described in detail hereinbelow, the magnet-assisted locking mechanisms of the present disclosure are configured to automatically unlock.

According to embodiments of the present disclosure, a double rotating flipper locking mechanism for maintaining tension on a halyard includes: a housing having an internal space and configured to receive a slug that moves along a path through the housing, the slug being operably connected to the halyard, the housing including a first housing side and a second housing side coupled to one another; first and second flippers rotatably disposed in the housing, the first and second flippers configured to rotate between at least a cocked position in which the slug is inserted into the housing, a locked position in which a surface of the first and second flippers receive the slug and impede the slug from exiting the housing along the path, wherein the halyard is tensioned in the locked position, and a neutral position in which the first and second flippers allow movement of the slug; and a magnet assembly configured to effect rotation of the first and second flippers, the magnet assembly including at least: first and second housing magnets disposed within the first housing side, third and fourth housing magnets disposed within the second housing side, first and second flipper magnets disposed within the first flipper, and third and fourth flipper magnets disposed within the second flipper.

Furthermore, according to embodiments of the present disclosure, a single rotating flipper locking mechanism for maintaining tension on a halyard includes: a housing having an internal space and configured to receive a slug that moves along a path through the housing, the slug being operably connected to the halyard, the housing including a first housing side and a second housing side coupled to one another; a flipper rotatably disposed in the housing, the flipper configured to rotate between at least a cocked position in which the slug is inserted into the housing, a locked position in which a surface of the flipper receives the slug and impedes the slug from exiting the housing along the path, wherein the halyard is tensioned in the locked position, and a neutral position in which the flipper allows movement of the slug; and a magnet assembly configured to effect rotation of the flipper, the magnet assembly including at least: a first housing magnet disposed within the first housing side, a second housing magnet disposed within the second housing side, and first and second flipper magnets disposed within the flipper.

Furthermore, according to embodiments of the present disclosure, an alternating direction flipper locking mechanism for locking a headboard device of a sailing vessel includes: a housing having at least one track along which the headboard device travels in a upward and downward direction; a flipper rotatably disposed in the housing, the flipper having a notch formed therein, the flipper configured to rotate between at least a neutral position in which the flipper allows movement of the headboard device, a cocked position in which the headboard device travels upward past the flipper, and a locked position in which the notch of the flipper receives the headboard device and impedes the headboard device from downwardly exiting the housing; and a magnet assembly configured to effect rotation of the flipper, the magnet assembly including at least four housing magnets disposed within the housing and a first flipper magnet disposed within the flipper, three of the at least four housing magnets having a polarity that is opposite a polarity of the first flipper magnet, and one of the at least four housing magnets having a polarity that is the same as the polarity of the first flipper magnet.

Furthermore, according to embodiments of the present disclosure, a magnetic unlock prevention mechanism for preventing a halyard lock from unlocking includes: a housing having at least one track along which the halyard lock travels in a upward and downward direction; first and second flippers rotatably disposed in the housing, the first and second flippers in continuous contact with each other such that rotation of the first flipper effects rotation of the second flipper, the first and second flippers configured to rotate between at least an a stowed position in which the first and second flippers are stowed, an unlock preventing position in which the halyard lock travels upward past the first and second flippers, such that unlocking of the halyard lock is prevented, and a disengaged position in which the first and second flippers allow the unlocking of the halyard lock; and a magnet assembly configured to effect rotation of the flipper, the magnet assembly including at least a first housing magnet disposed within the housing, a first flipper magnet disposed within the first flipper, and a second flipper magnet disposed within the second flipper, the first and second flipper magnets having a polarity that is opposite a polarity of the first housing magnet.

Furthermore, according to embodiments of the present disclosure, an automatic upstop locking mechanism for locking a headboard device of a sailing vessel includes: a housing having at least one track along which the headboard device travels in a upward and downward direction; a flipper rotatably disposed in the housing, the flipper configured to rotate between at least a neutral position in which upward and downward movement of the headboard device is permitted, an unlocked position in which upward movement of the headboard device is prevented to unlock a halyard, and a locked position in which upward movement of the headboard device is prevented to lock the halyard; and a magnet assembly configured to effect rotation of the flipper, the magnet assembly including at least five housing magnets disposed within the housing and a first flipper magnet disposed within the flipper, three of the five housing magnets having a polarity that is opposite a polarity of the first flipper magnet, and two of the five housing magnets having a polarity that is the same as the polarity of the first flipper magnet.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
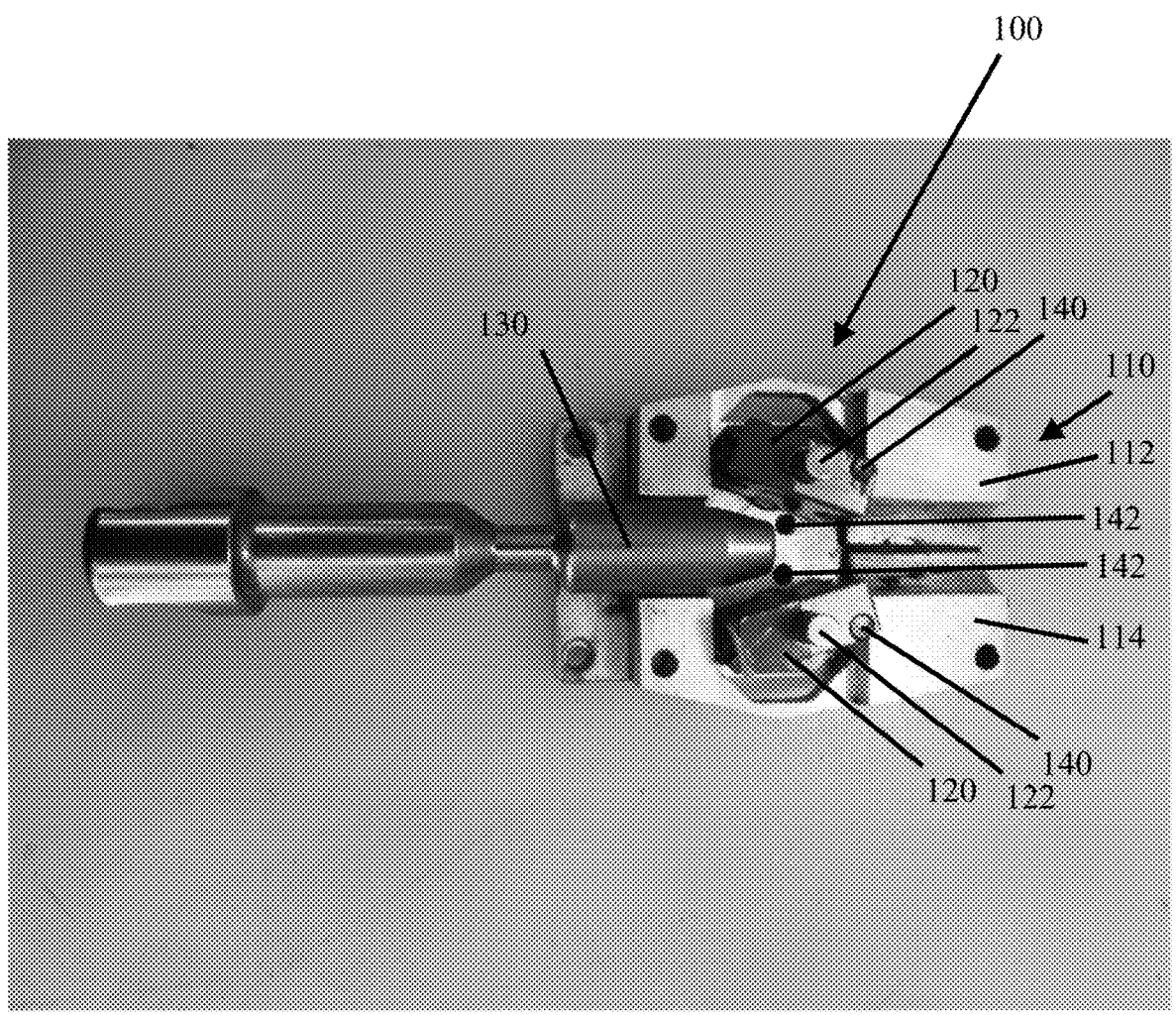
FIGS. 1-8 include views of a double rotating flipper locking mechanism according to embodiments of the present disclosure.
Figure 2:
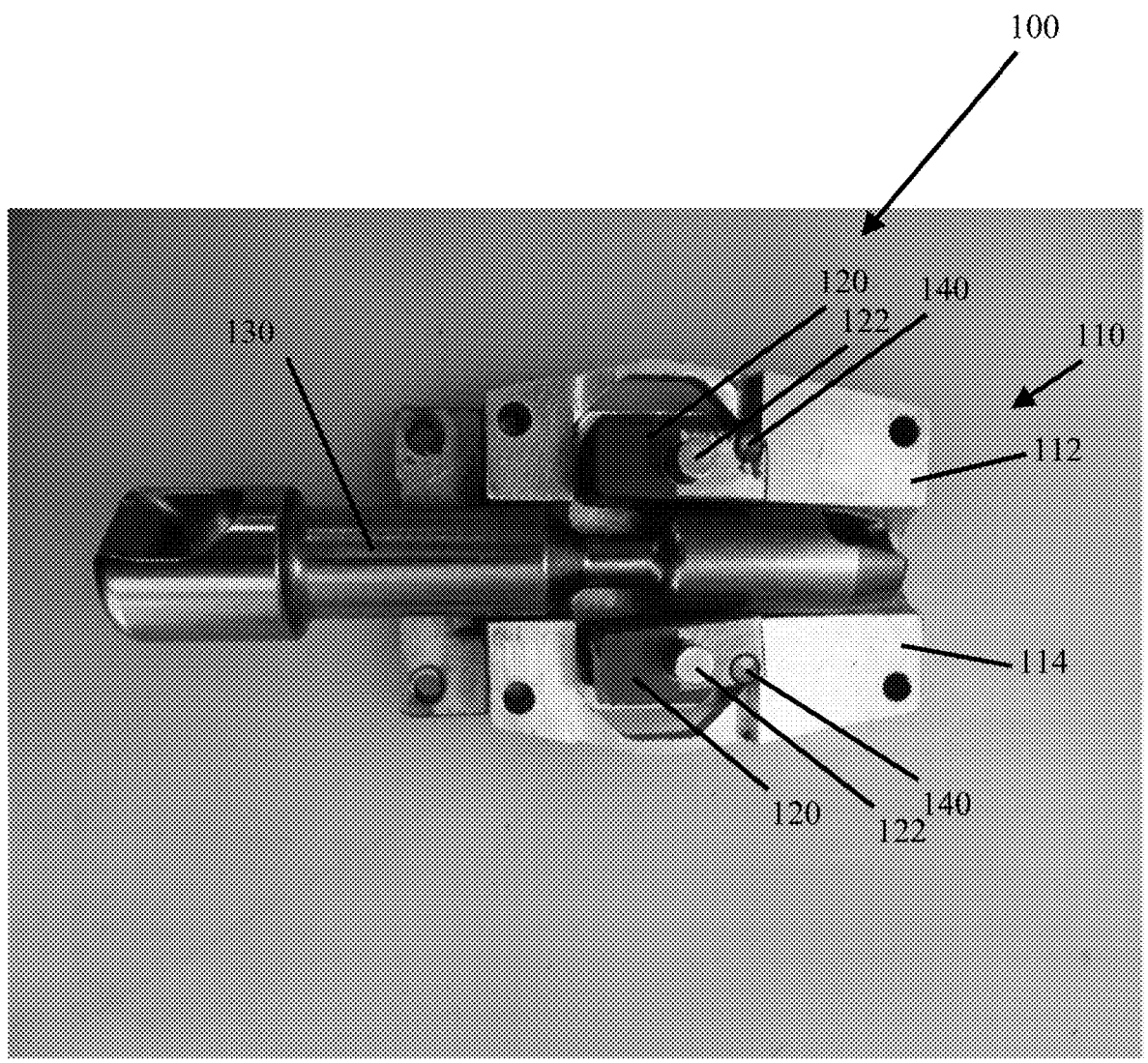
Figure 3:
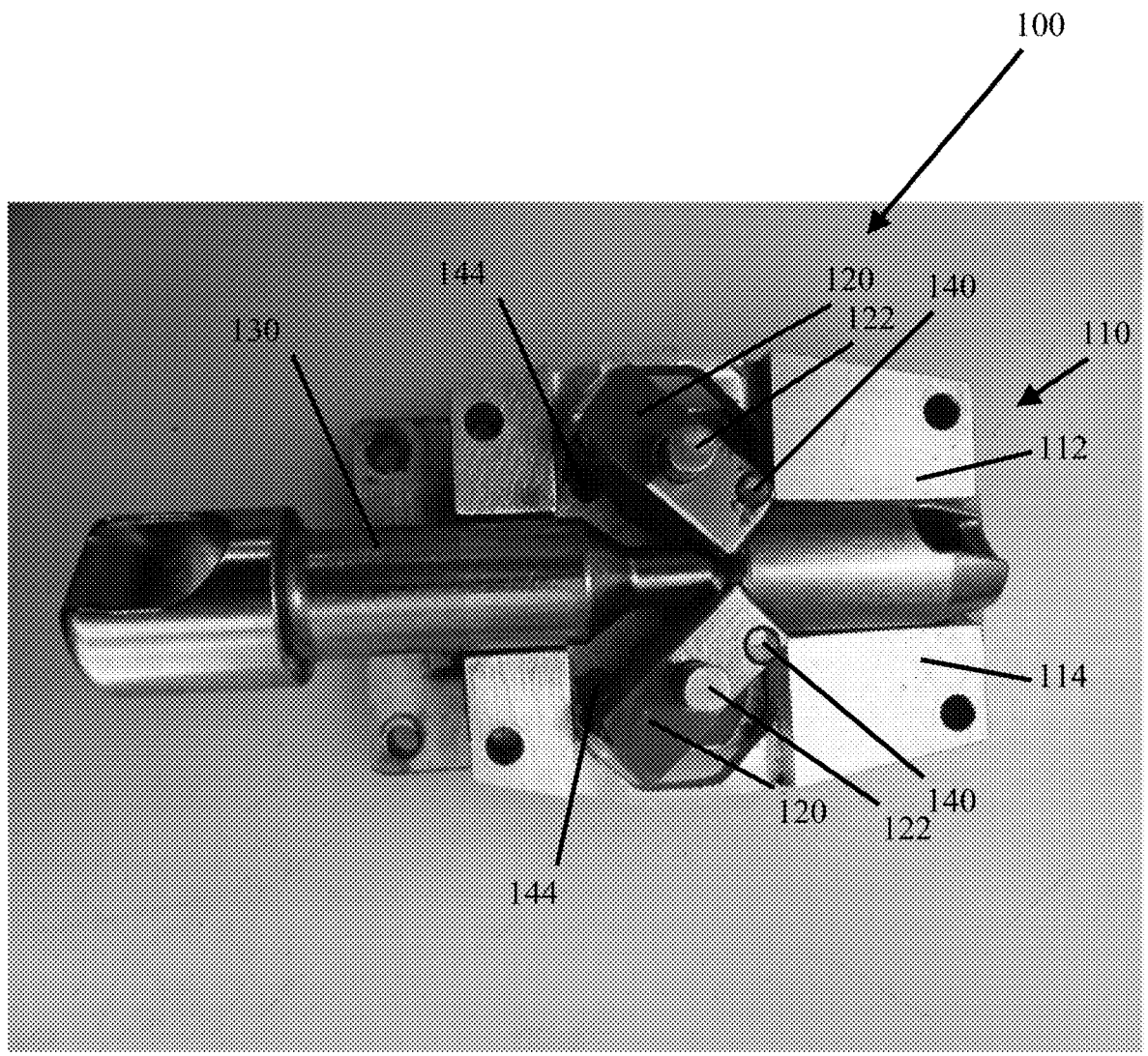
Figure 4:
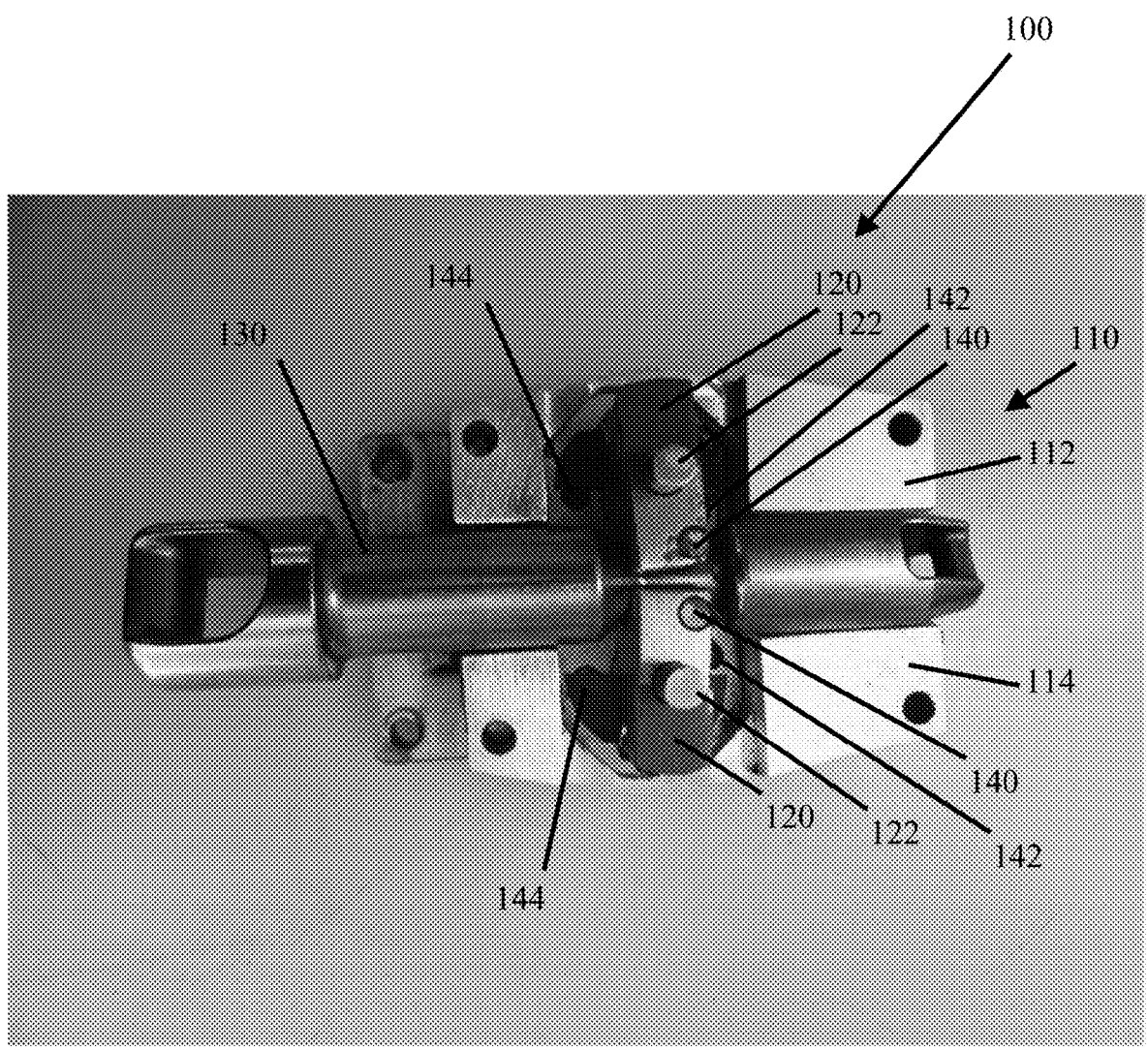
Figure 5:
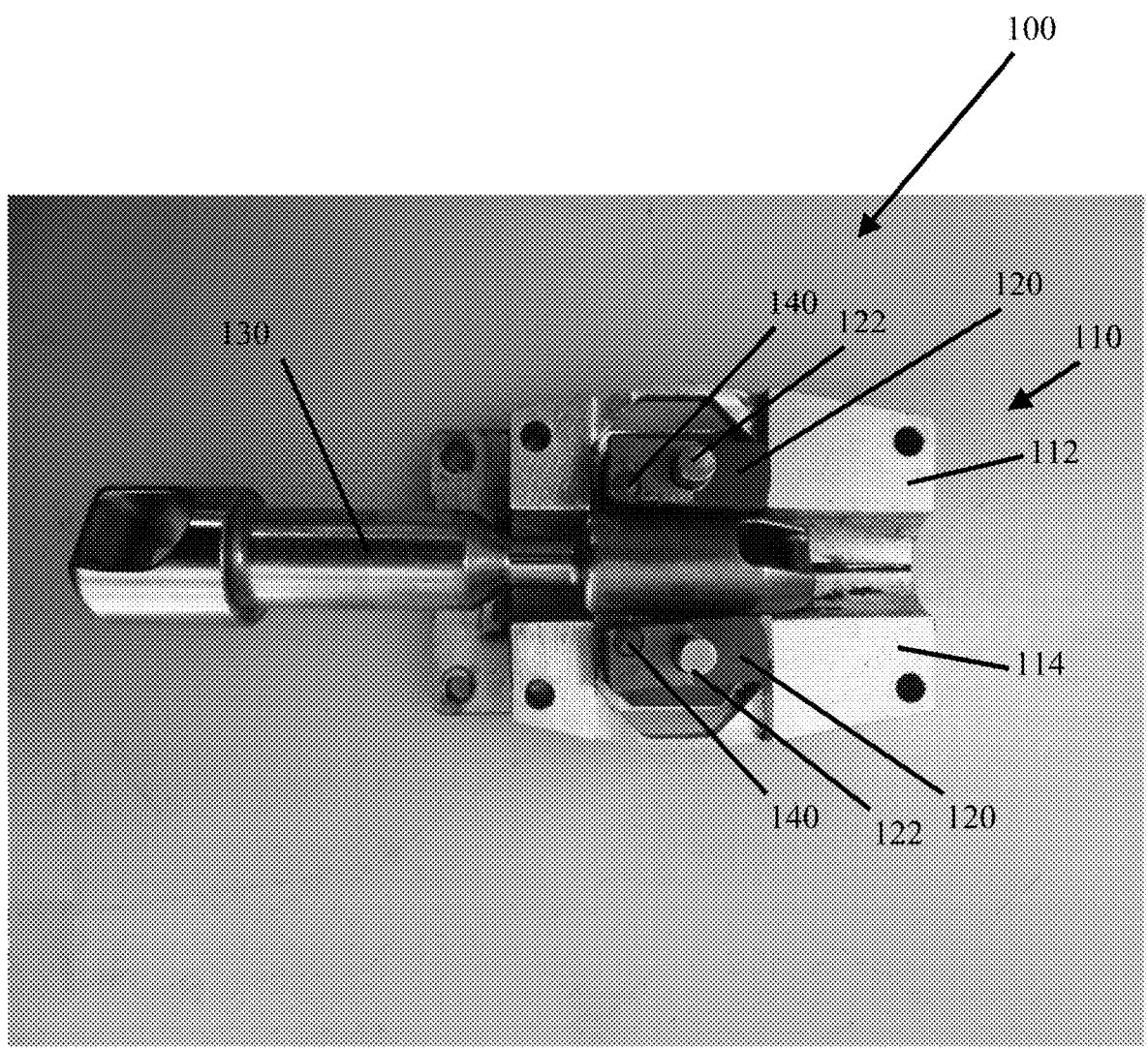
Figure 6:
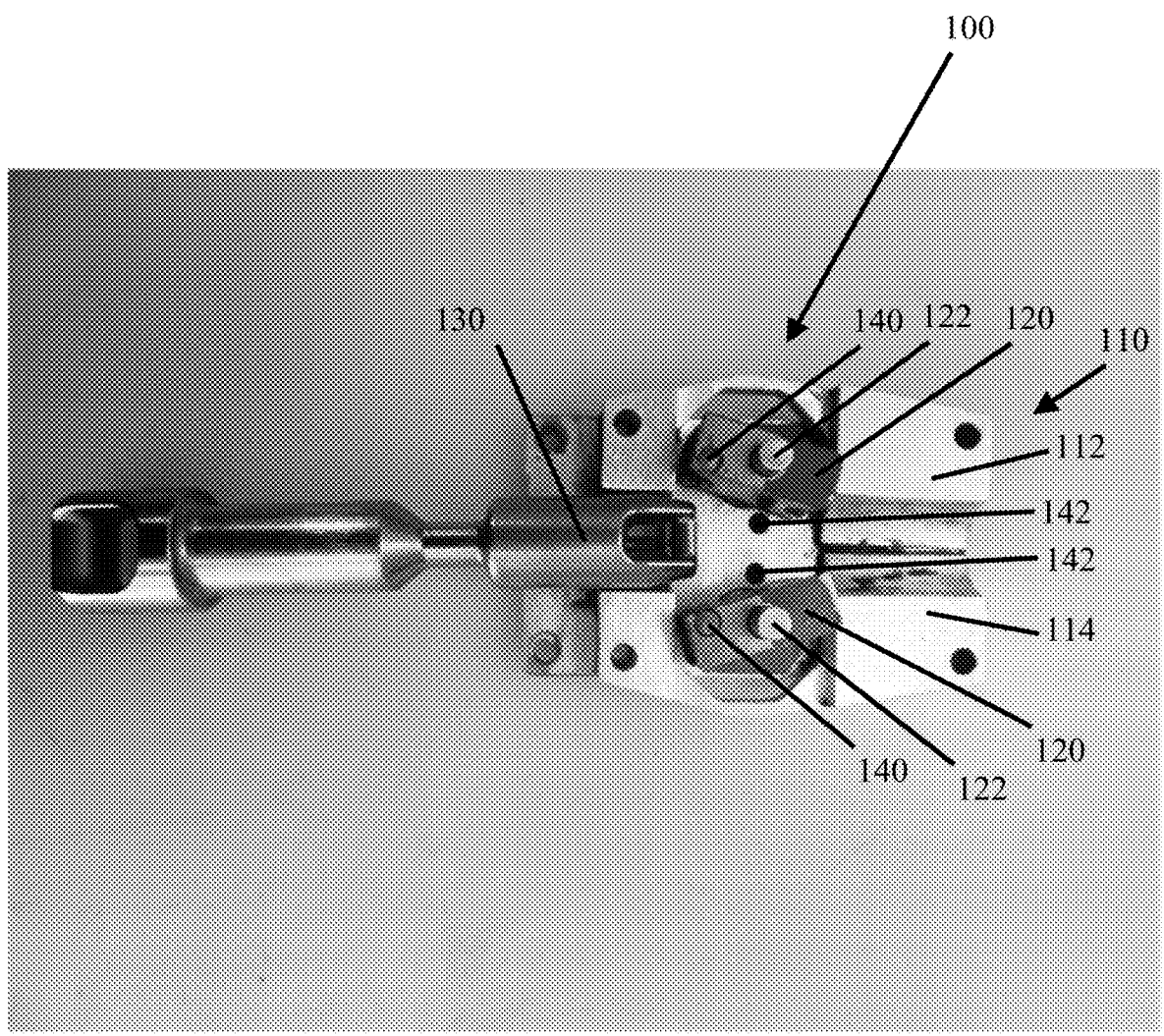
Figure 7:
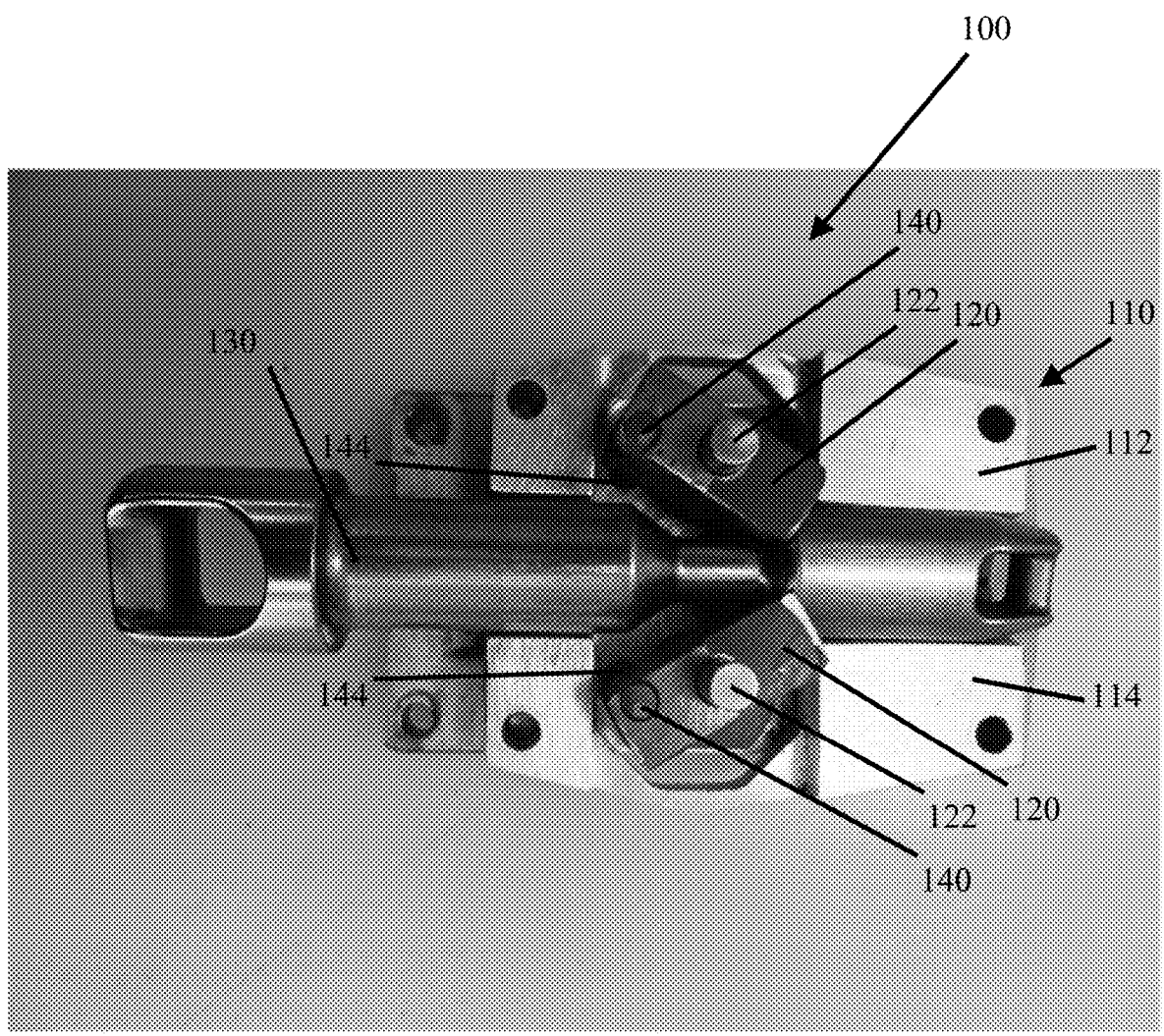
Figure 8:
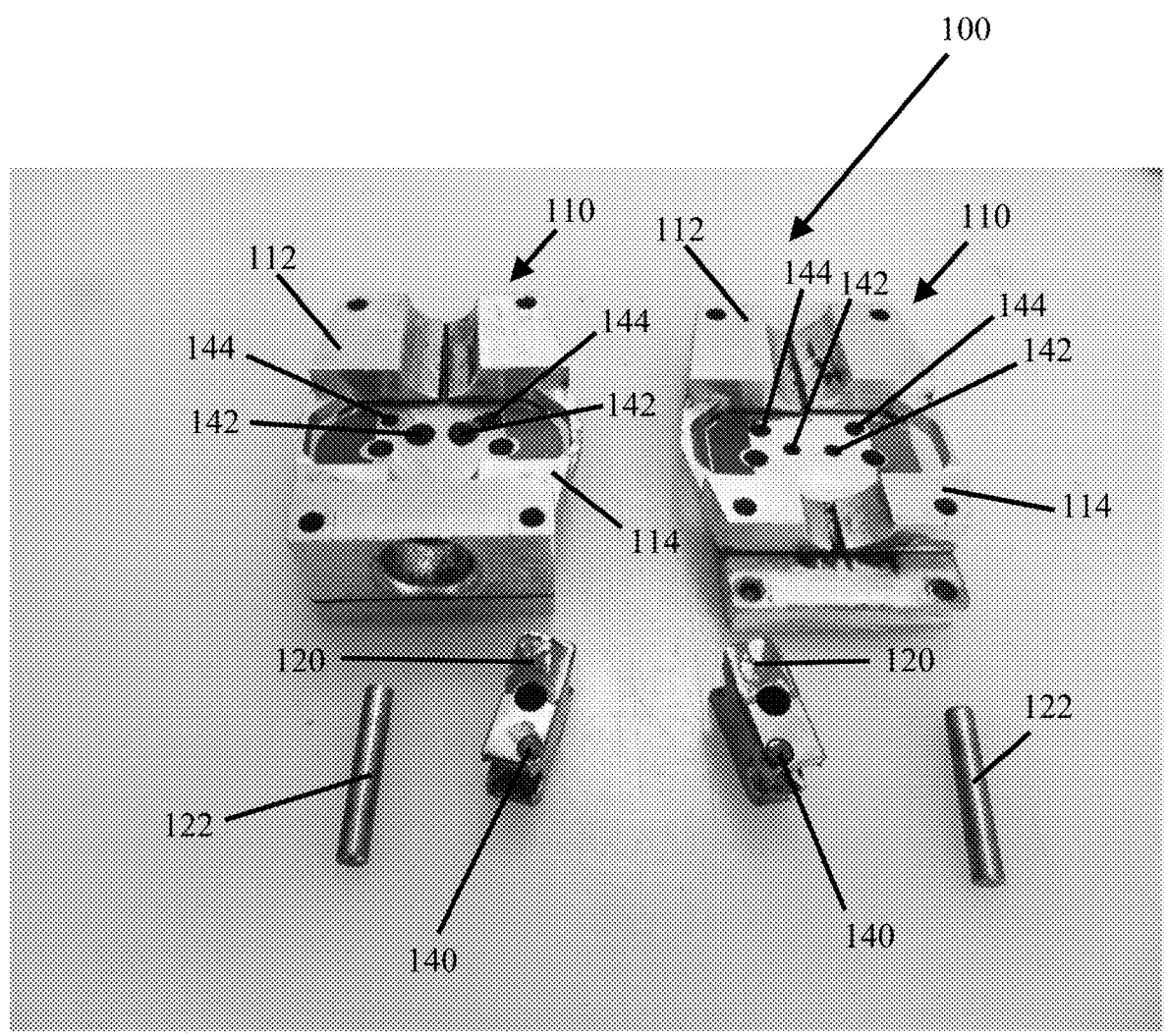
Figure 9:
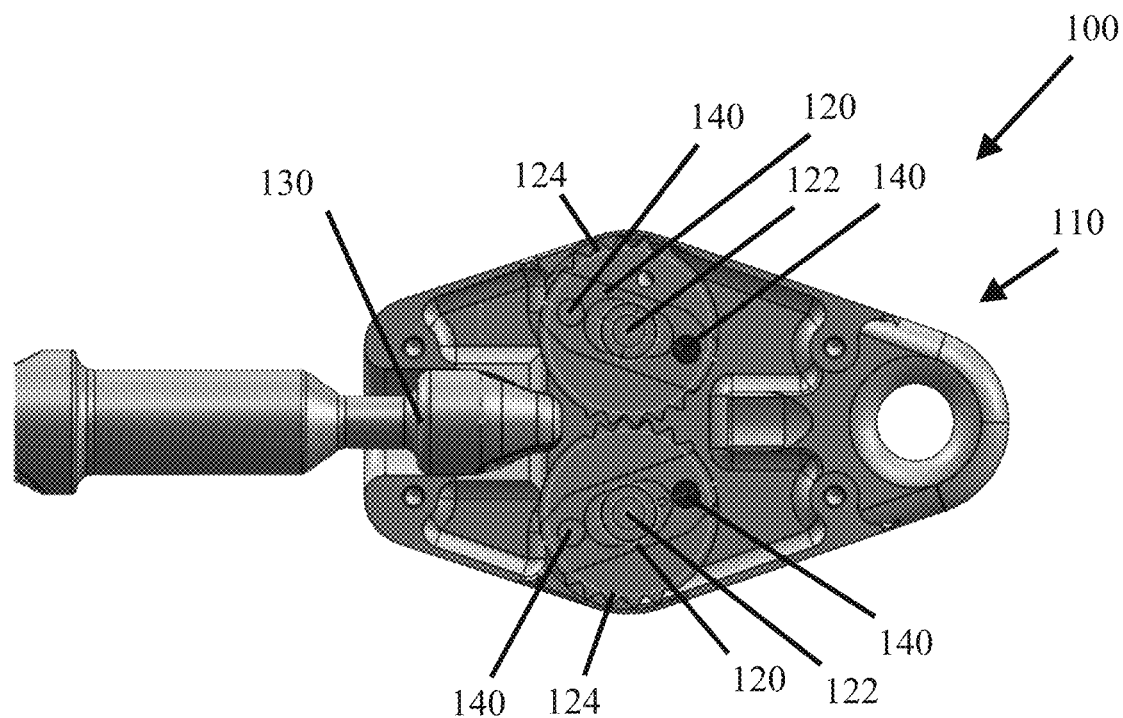
FIGS. 9-17 include additional views of the double rotating flipper locking mechanism according to embodiments of the present disclosure.
Figure 10:
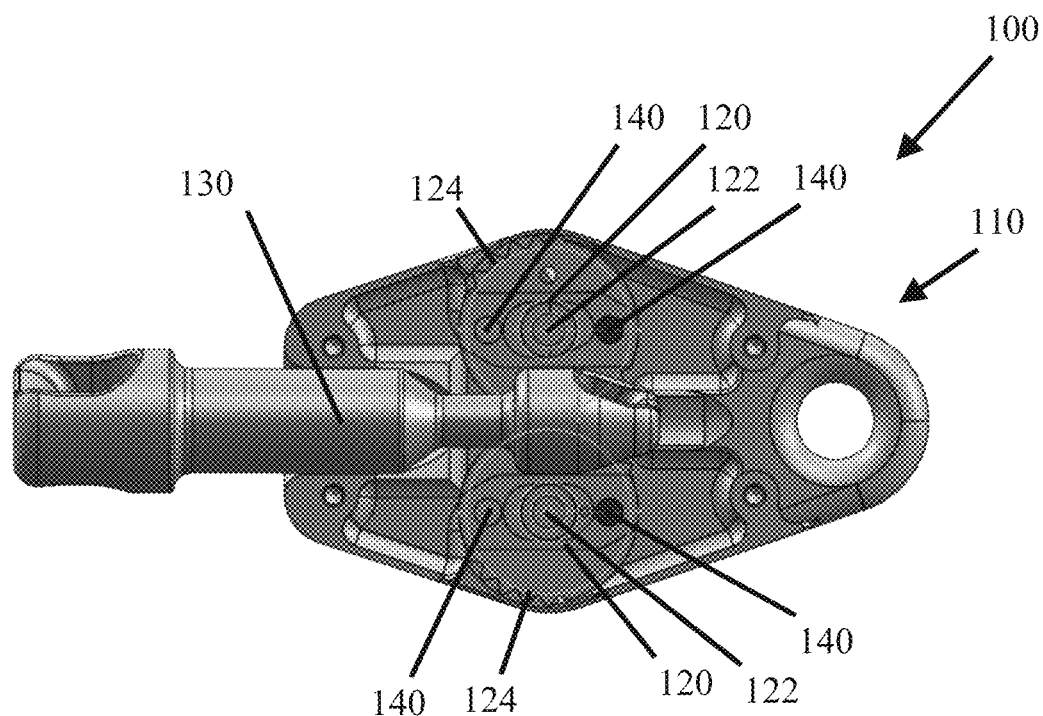

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring now to embodiments of the present disclosure, the disclosed magnet-assisted automatic locking mechanisms include a magnet assembly for controlling the operation of components of a halyard lock and/or a headboard device of a sailing vessel through forces of magnetic attraction and repulsion. The magnet assembly includes one or more magnets embedded in a housing of the locking mechanisms (i.e., "housing magnets") and one or more magnets embedded in a flipper of the locking mechanism (i.e., "flipper magnets"). The magnets are strategically positioned within the locking mechanisms and the respective polarities of the magnets are controlled such that the housing magnets interact with the flipper magnets in a desired manner through forces of magnetic attraction and/or repulsion, thereby controlling operation of the lock.

Accordingly, the magnet-assisted locking mechanisms described herein can operate without an attendant tripline. To lock a halyard, the halyard can be hoisted against an end stop, thereby enabling the halyard to engage the lock. To release the halyard from a locked condition, the halyard can again be hoisted against its stop to release tension. Due to its configuration, described in detail hereinbelow, the locking mechanisms of the present disclosure are configured to automatically unlock.

FIGS. 1-8 include views of a double rotating flipper locking mechanism 100 according to embodiments of the present disclosure, and FIGS. 9-17 include additional views of the double rotating flipper locking mechanism 100 according to embodiments of the present disclosure. As throughout FIGS. 1-17, two opposing latch flippers may combine to hold a slug device in a locked position, and then automatically release the slug when the slug is lifted slightly, causing the opposing flippers to "reset" by rotating about 180°. The action of the flippers can be controlled by a magnet assembly, described in greater detail below.

The double rotating flipper locking mechanism 100 may include two locking flippers 120 (referred to hereinbelow as "flippers") acting in opposite directions to keep a locking slug 130 (referred to hereinbelow as a "slug") from passing by. The flippers 120 may have magnets placed opposite each other around a centerline of the flippers 120. The magnetic assembly 140 can consist of two or four magnets in each flipper 120.

The locking housing 110 (referred to hereinbelow as a "housing") may include a first housing side 112 and a second housing side 114 coupled to one another. Like the flippers 120, the housing 110 may also comprise magnets. One or two magnets may be disposed in each of the first and second housing sides 112 and 114 at angles such that the flippers 120 are held in either a "cocked" position or a "neutral" position. The housing magnets may be referred to as a neutral position magnet 142 and a cocked position magnet 144. The two flippers 120 rotatably coupled to the housing 110 by two flipper pins 122.

Figure 11:
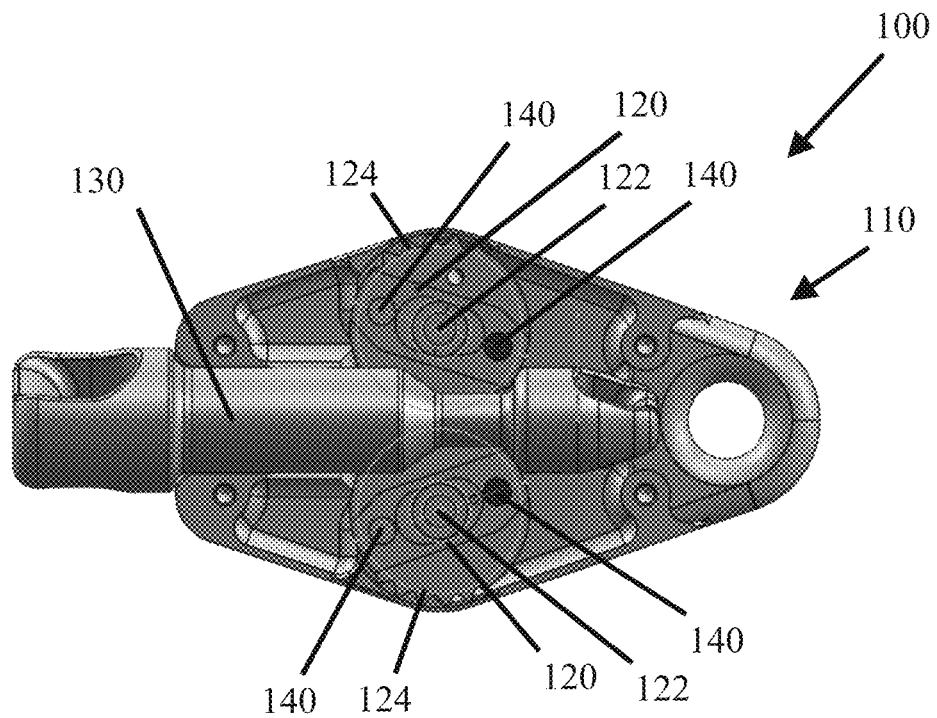
Figure 12:
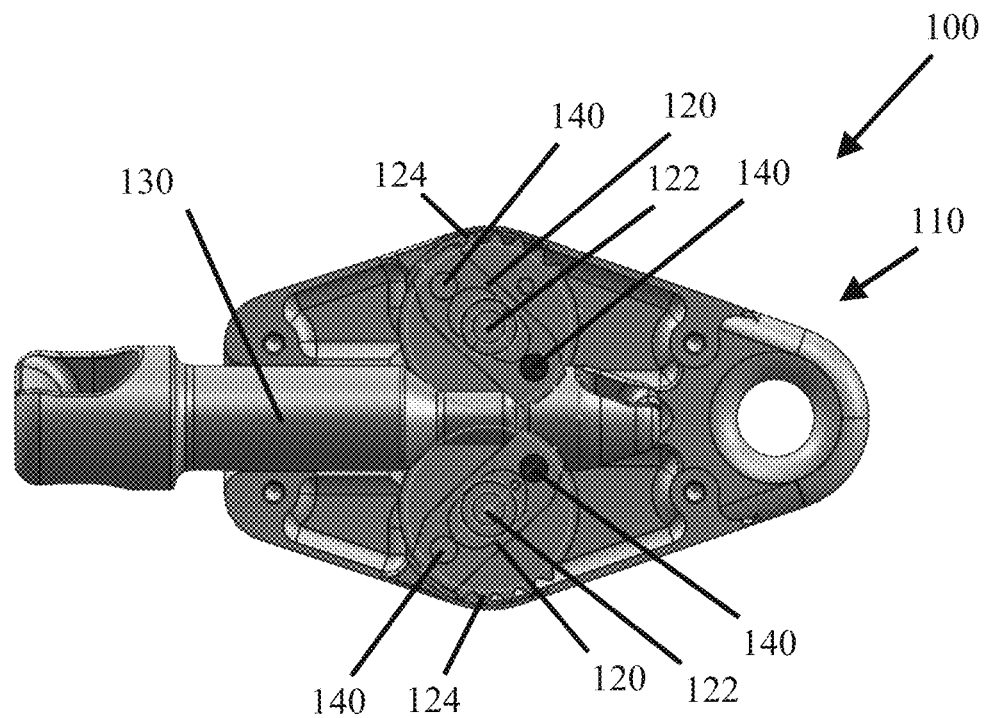

Operationally, as the bullet-shaped head of the slug 130 enters the housing 110 (see FIGS. 9 and 10) and passes the flippers 120 (from left to right), the flippers 120 are pushed into a cocked position at an angle less than 45° with respect to a centerline of the housing 110 (see FIG. 11). When the slug 130 is pulled back in a down direction (from right to left), the bullet engages the flippers 120 and "locks," moving the flippers 120 into a position of opposed 45° angles with respect to the centerline of the housing 110 (see FIG. 12).

Figure 13:
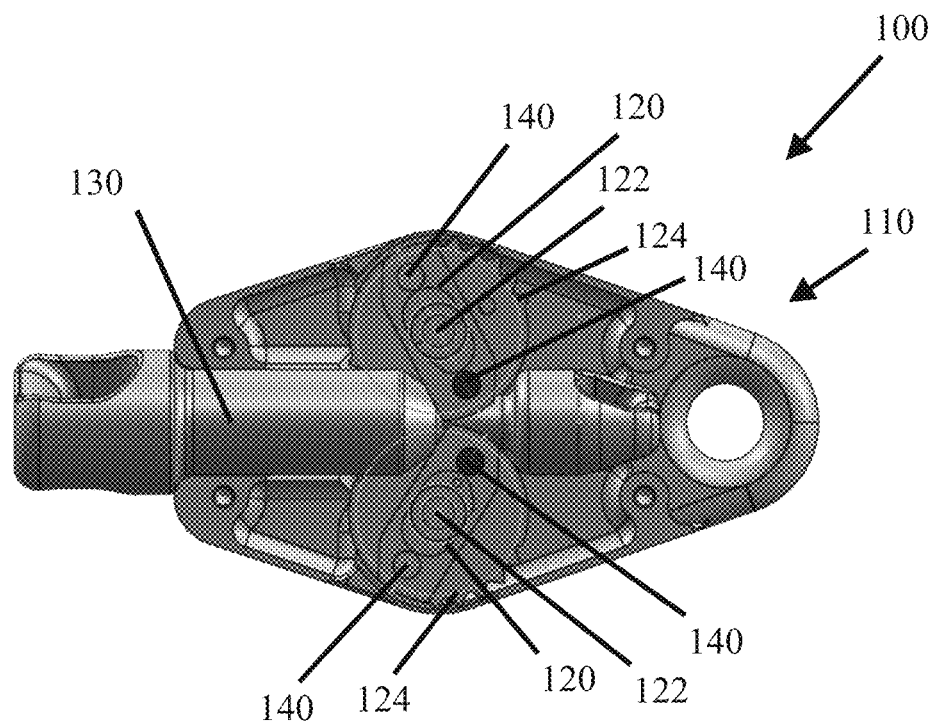
Figure 14:
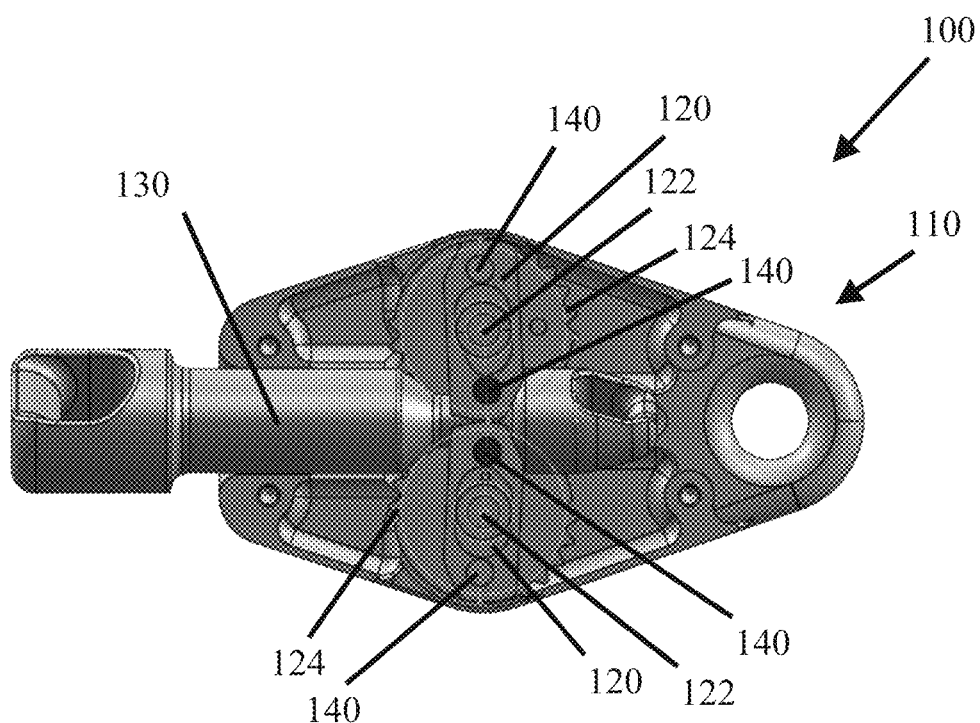
Figure 15:
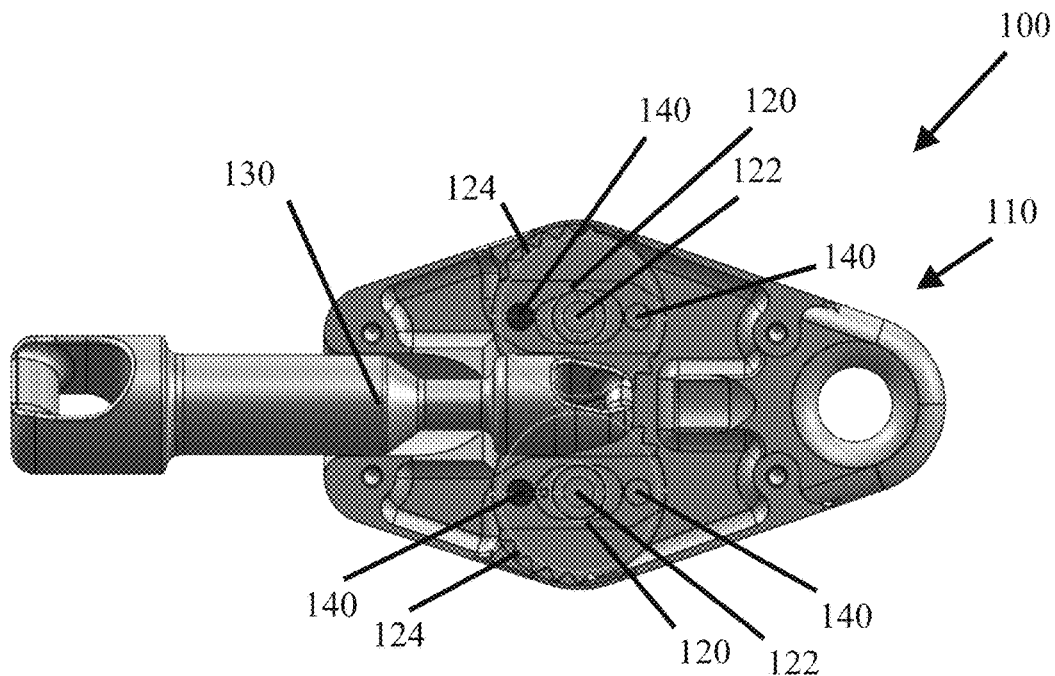
Figure 16:
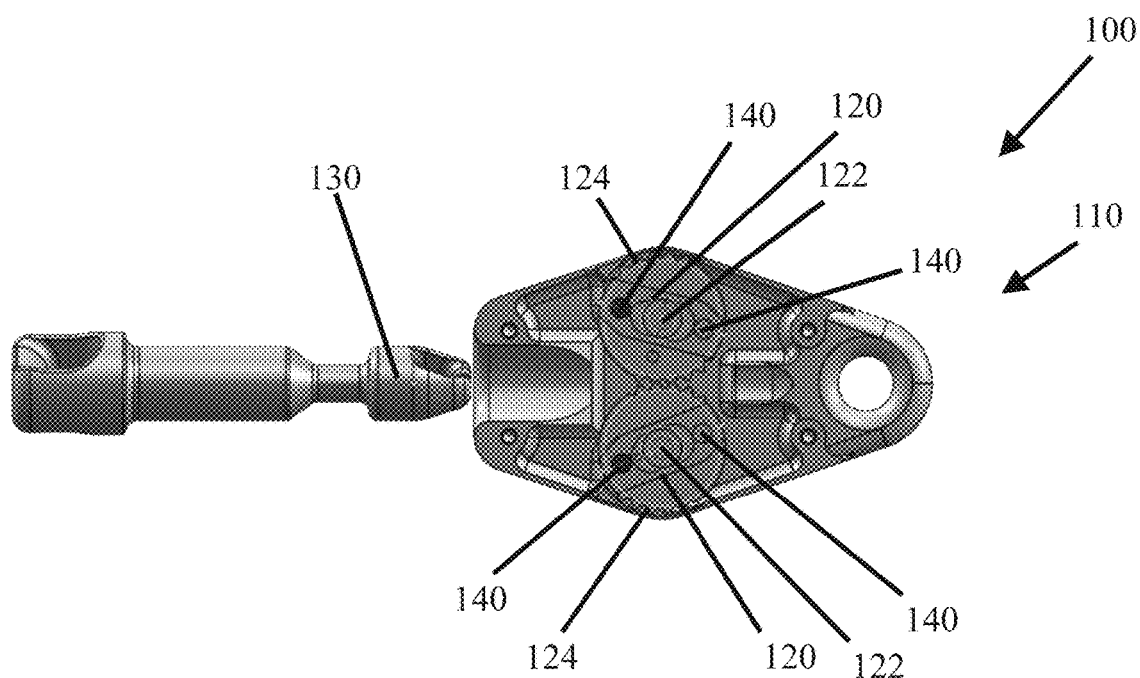
Figure 17:
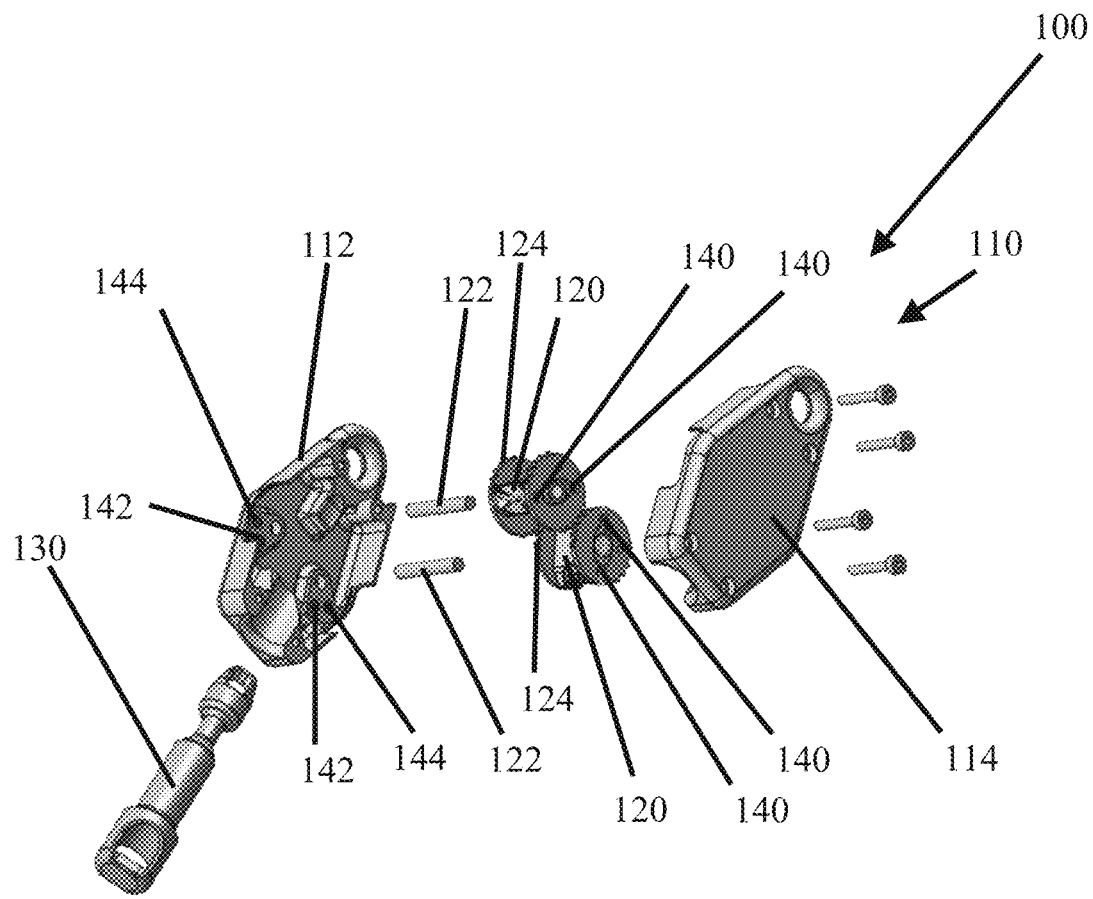
Figure 18:
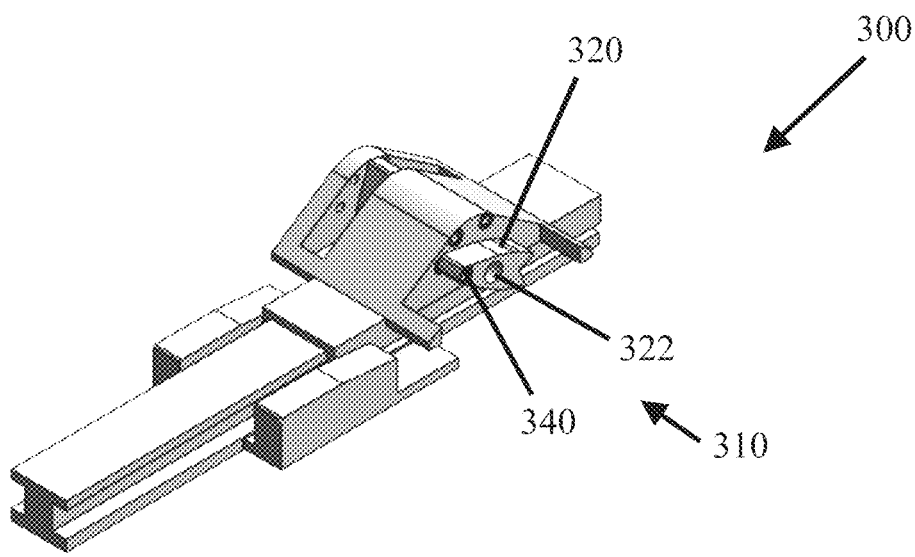
FIGS. 18-27 include views of an alternating direction flipper locking mechanism with a double track according to embodiments of the present disclosure.
Figure 19:
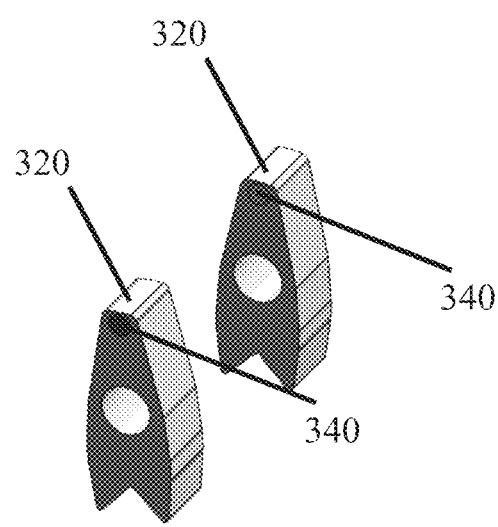
Figure 20:
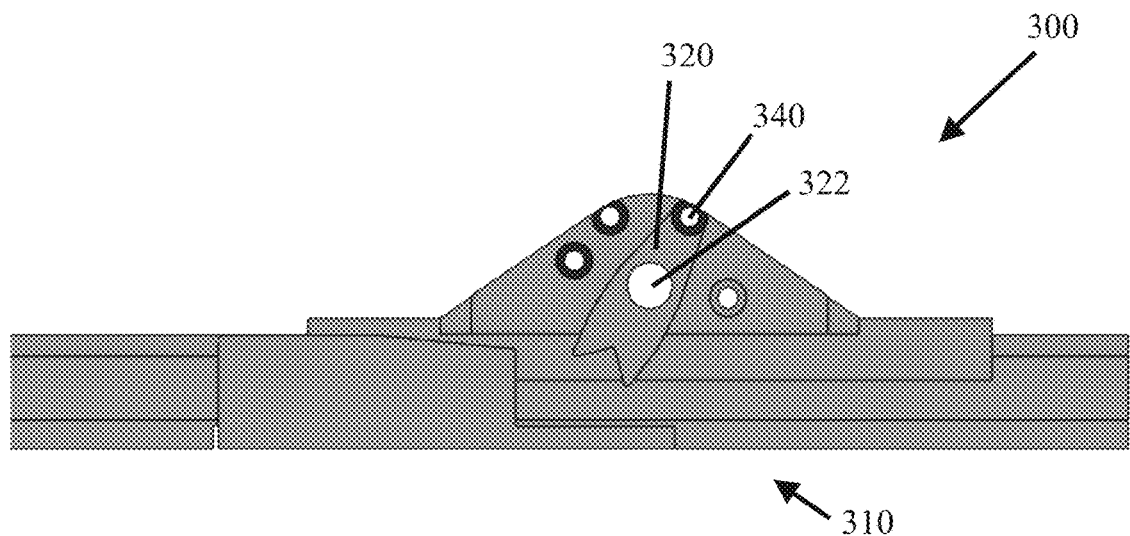
Figure 21:
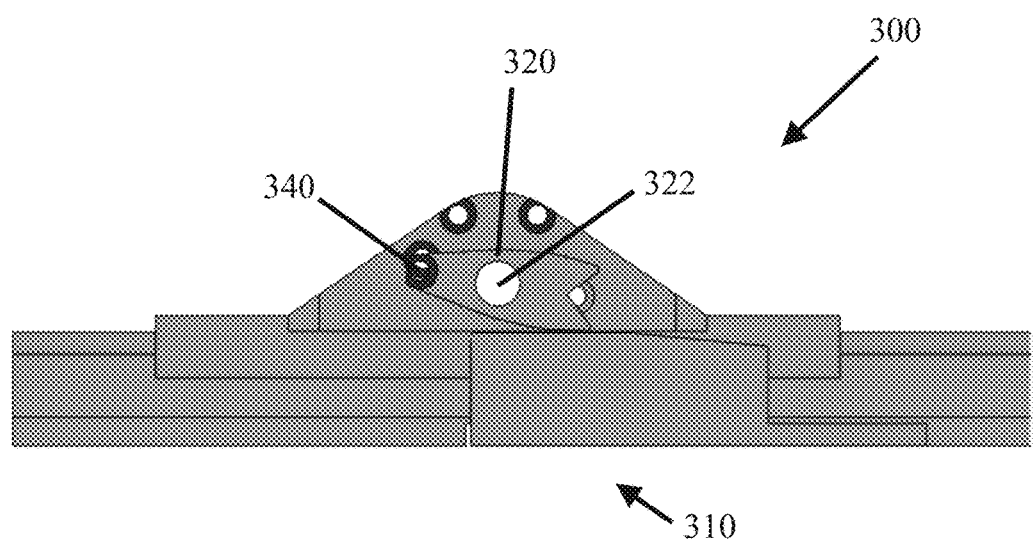
Figure 22:
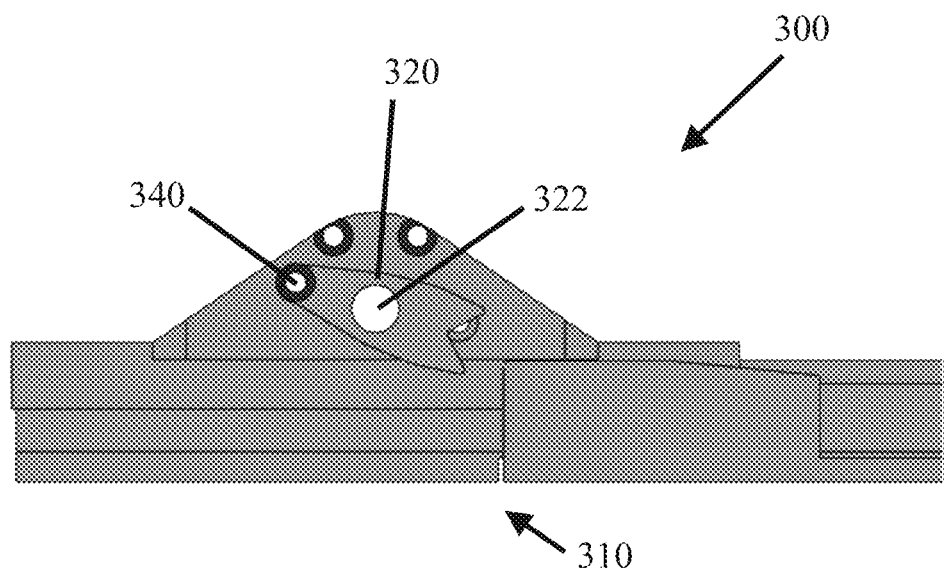
Figure 23:
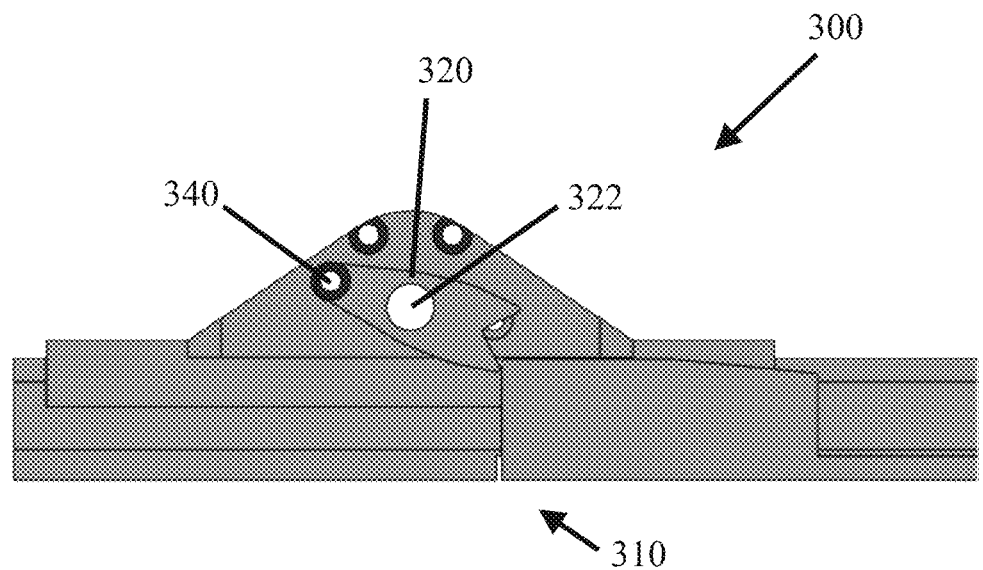
Figure 24:
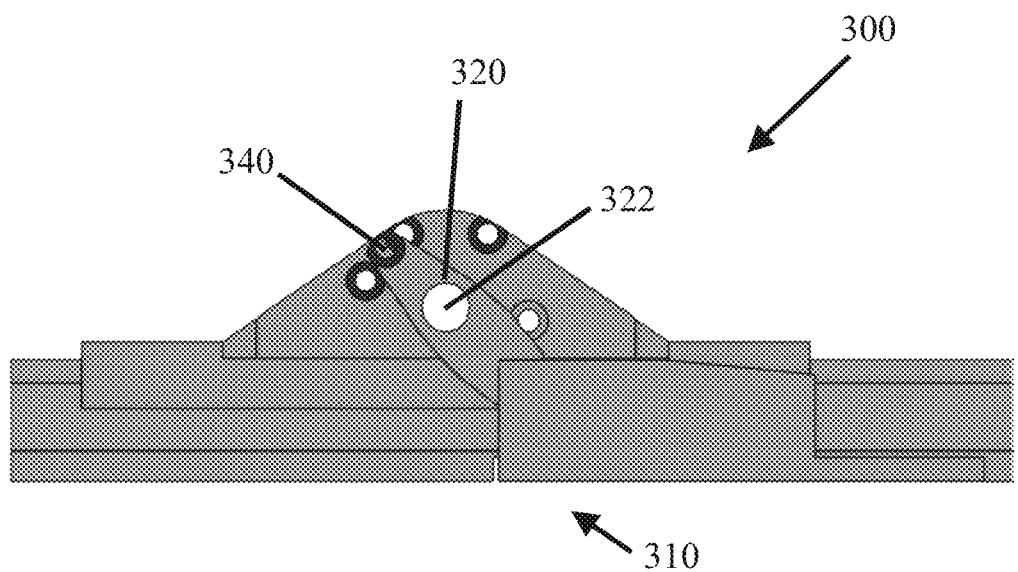

In the unlocking operation, the bullet-shaped head of the slug 130 is hoisted above the flippers (from left to right) (see FIG. 13). At the 45° position, the neutral position magnet 142 is closer to the 45° angle than the cocked position magnet 144, thereby pulling the flippers 120 into the neutral position. This allows the flippers 120 to disengage allowing the system to "unlock." As the slug 130 passes out of the housing (see FIGS. 14 and 15), the flippers 120 may continue to rotate, eventually coming to a stop on the cocked position magnet 144 180° from the original cocked position (see FIG. 16). In this position, the double rotating flipper locking mechanism 100 is ready to receive the slug 130 to repeat the same operation.

As part of the magnet assembly 140, the flippers 120 may include magnets to interact with the housing magnets. Specifically, each flipper 120 may have either two or four magnets disposed therein. In the case of two magnets in each flipper 120, the flipper magnets can either be disposed on one side of each flipper 120, or there may be one magnet disposed on either side of the flipper 120. Either way, the two flipper magnets should be positioned 180° apart around the centerline of the flipper 120. In the case of four magnets in each flipper 120, there may be two flipper magnets positioned on each end of the flippers 120.

Each flipper 120 can be fitted with toothed gears 124 to keep each flipper 120 in the correct angular relation to the other, opposing flipper 120. The gear tooth array 124 can prevent the flippers 120 from becoming misaligned with each other.

Meanwhile, the housing 110, which may include a first housing side 112 and a second housing side 114 coupled to one another (e.g., fastened together by machine screws), may include two or four magnets per housing side. In the case of two magnets in each of the first and second housing side, one housing magnet can be positioned at each of the cocked position and the neutral position. Alternatively, the two housing magnets per side can be disposed in either in the cocked position or the neutral position. Either way, the mating half or opposite side of the housing 110 should have matching magnet arrangements. In the case of two magnets in each of the first and second housing side, two housing magnets may be installed at each of the cocked position and the neutral position. Depending on the position of the flipper magnets in the flippers 120, one side or both sides of the housing 110 can have four magnets installed.

Alternatively, FIGS. 61-68 include views of a single rotating flipper locking mechanism according to embodiments of the present disclosure. As shown in FIGS. 61-68, the single rotating flipper locking mechanism 200 may operate in a manner similar to the double rotating flipper locking mechanism 100 but include only a single locking flipper 220 acting on the slug 230. The single flipper 220 may hold the slug 230 locked against an opposing surface, then automatically release the slug 230 when it is lifted slightly (from left to right), causing the flipper 220 to rotate through about 180° and reset its position. The flipper 220 may be rotatably coupled to the housing 210 by a flipper pin 222.

The magnetic assembly 240 may be configured similarly to the magnetic assembly 140. The lone flipper 220 may have two or four magnets positioned opposite each other along a centerline of the flipper 220. The housing 210 may have one or two disposed in each of the first housing side 212 and the second housing side 214 at angles such that the flipper 220 is held in either a cocked position or a neutral position.

Figure 63:
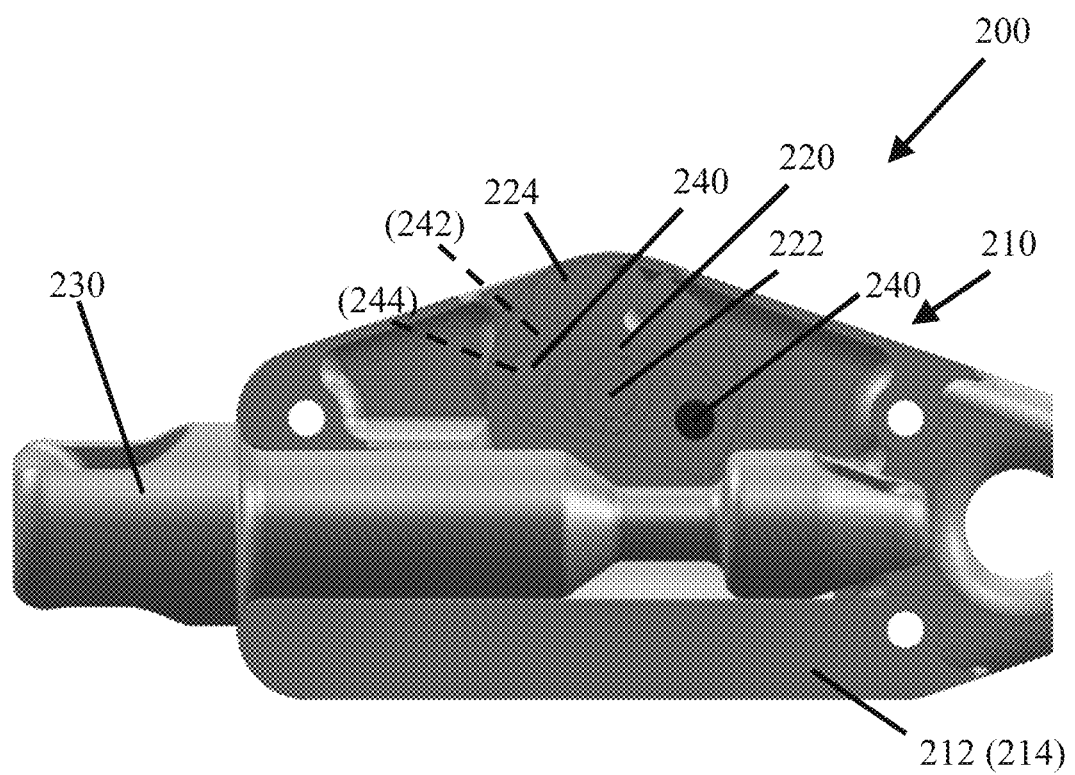
Figure 64:
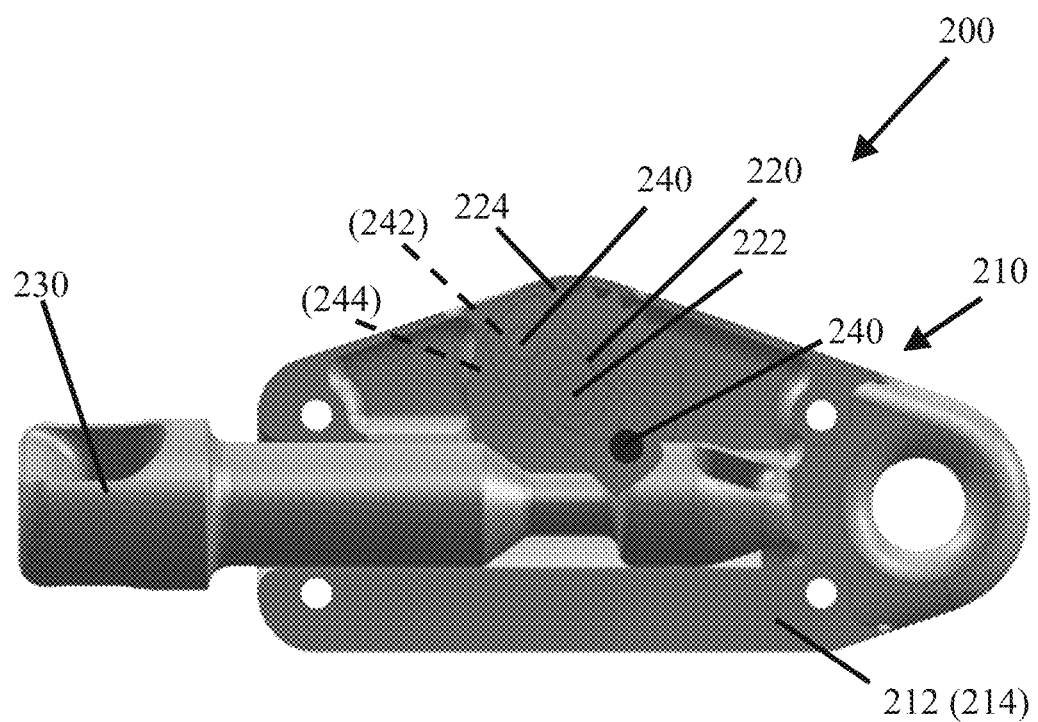

Operationally, as the bullet-shaped head of the slug 230 enters the housing 210 (FIGS. 61 and 62) and passes the flipper 220 (from left to right), the flipper 220 may be pushed into the cocked position at an angle less than 45° with respect to a centerline of the housing 210 (see FIG. 63). When the slug 230 is pulled back in a down direction (from right to left), the slug 230 may engage the flipper 220 and "lock," thus moving the flipper 220 to a 45° angle with respect to the centerline of the housing 210 (see FIG. 64). In this position, the slug 230 may be held by an opposing surface of the flipper 220 a "locked" position.

Figure 65:
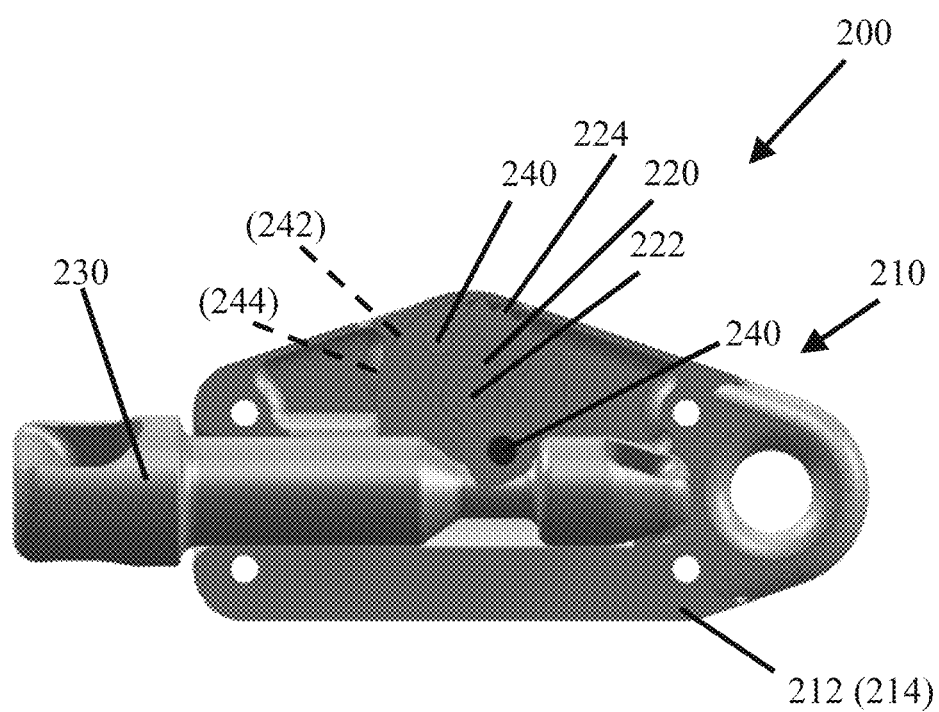
Figure 66:
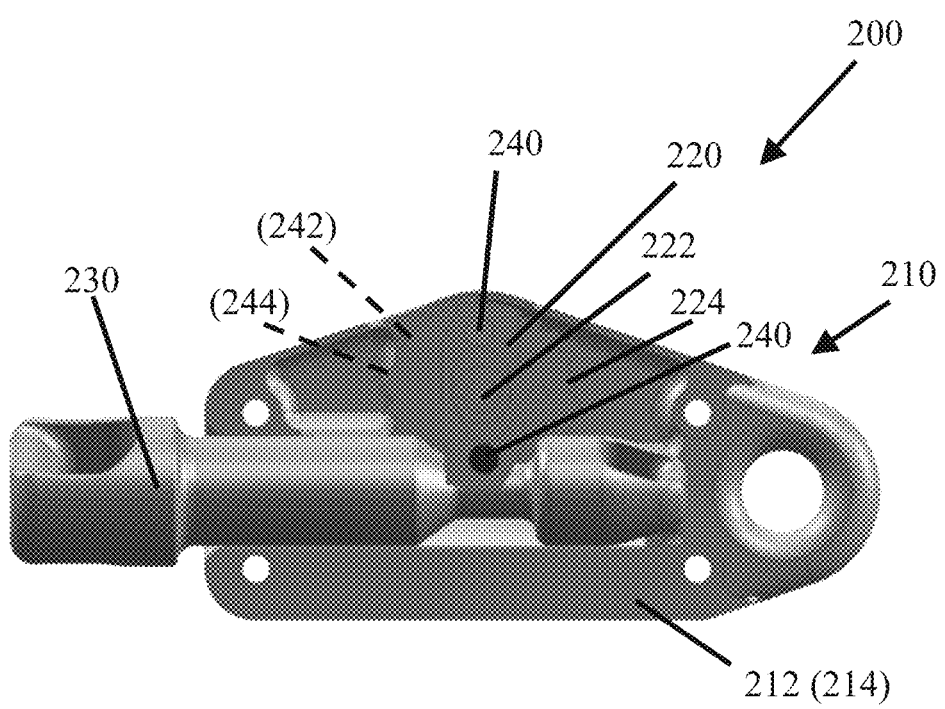
Figure 67:
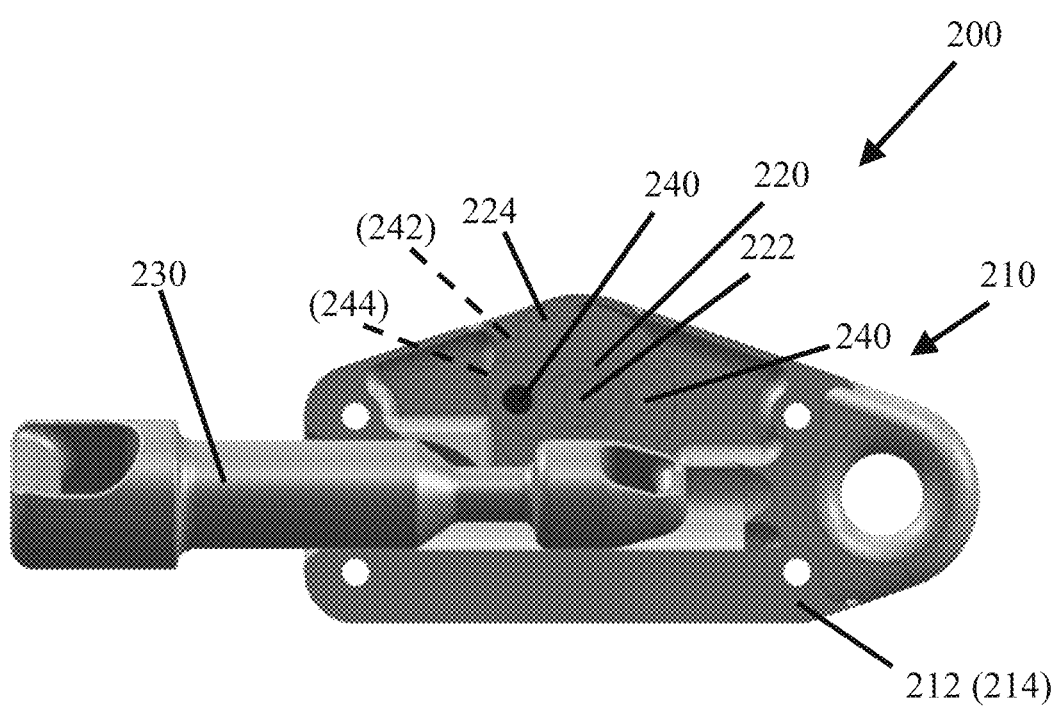
Figure 68:
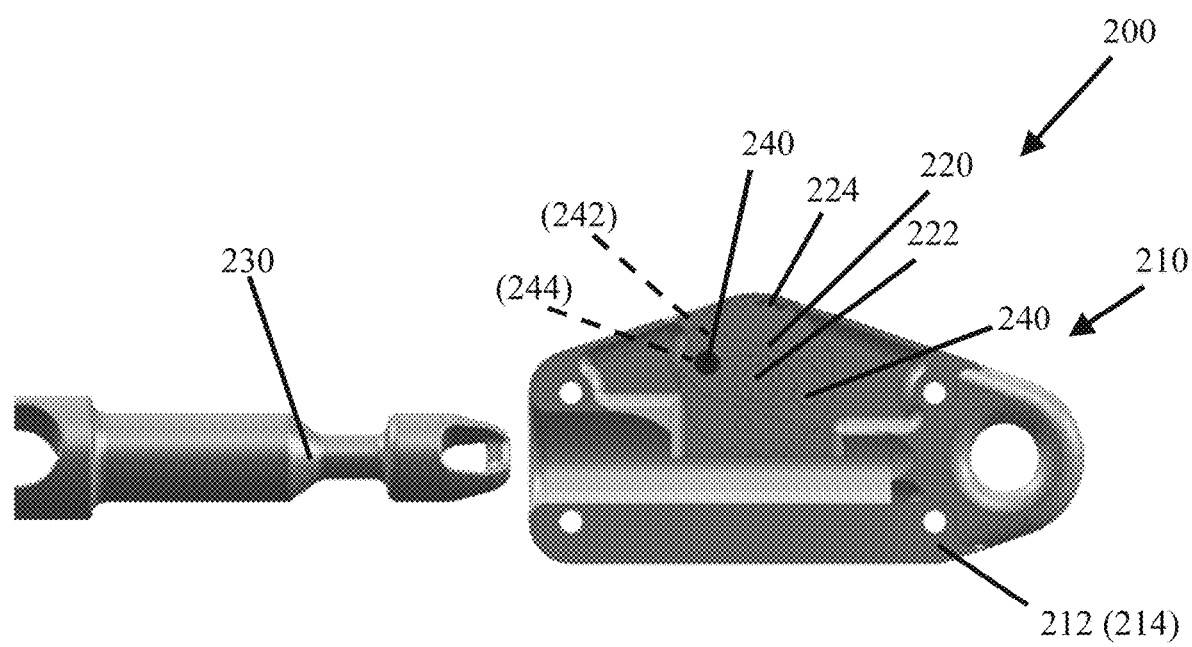

In the unlocking operation, the bullet-shaped head of the slug 230 is hoisted above the flipper 220 (from left to right) (see FIG. 65). At the 45° position, the neutral position magnet 242 is closer to the 45° angle than the cocked position magnet 244, thereby pulling the flipper 220 into the neutral position (see FIG. 66). This, in turn, allows the flipper 220 to disengage, causing the system to "unlock." As the slug 230 passes out of the housing 210 (from right to left), the flipper 220 continues to rotate (see FIG. 67), coming to a stop on the cocked position magnet 244, which is 180° offset from the original cocked position (see FIG. 68). The single rotating flipper locking mechanism 200 is now ready to again receive the slug 230 to repeat the operation above.

As part of the magnet assembly 240, the flipper 220 may have either two or four magnets. In the case of two magnets in the flipper 220, the flipper magnets can be positioned on opposing sides of the flipper 220 180° apart along the centerline of the flipper 220. In the case of four magnets in the flipper 220, two flipper magnets can be placed on each end of the flipper.

Meanwhile, the housing 210, which may include a first housing side 212 and a second housing side 214 coupled to one another (e.g., fastened together by machine screws), may include one or two magnets per housing side. In the case of one magnet in each of the first and second housing side, one housing magnet can be positioned at either the cocked position or the neutral position at each of the first and second housing side 212 and 214. The opposing housing side should have a matching magnet arrangement. In the case of two magnets in each of the first and second housing side, two housing magnets may be installed at each of the cocked position and the neutral position at each of the first and second housing side 212 and 214. Depending on the position of the flipper magnets in the flippers 220, one side or both sides of the housing 210 can have two magnets installed.

FIGS. 18-27 include views of an alternating direction flipper locking mechanism 300 with a double track according to embodiments of the present disclosure, and FIGS. 28-38 include views of an alternating direction flipper locking mechanism 300 with a single track according to embodiments of the present disclosure. As shown in FIGS. 18-38, the forces of magnetic attraction and repulsion resulting from the magnet assembly 340 are used to control the locking action of a flipper 320 that alternates direction through approximately plus-minus 90°. Here, the alternating direction flipper locking mechanism 300 may be used for locking a sailing yacht headboard device (i.e., car). The headboard device may be attached to a track on the back of a sailing yacht mast to hold the top of the sail to the track. The headboard device typically requires a locking system, such as the alternating direction flipper locking mechanism 300, to prevent loss of position due to the stretch of the halyard which hoists the device.

As described in greater detail below, the alternating direction flipper locking mechanism 300 may be configured in two distinct ways: 1) a double flipper track that locks on ramps disposed either side of the track; and 2) a single flipper track that locks in a "locking pocket" in the center of a track.

Each flipper 320 is formed with a notch that mates with an edge of the ramp or locking pocket. The notch may be formed with a discrete angle (e.g., 90°). Opposite the notch on the other side of the flipper pin 322, which connects the flippers 320 to the housing 310, the flipper 320 has a magnet ("flipper magnet") embedded therein (see FIG. 19). One side of the flipper 320 has a "North" pole (signified by a red color), and one side of the other flipper 320 has a "South" pole (signified by a green color).

The flippers 320 are configured to move across, at least, three principal positions (several intermediate positions are possible as well): 1) a "neutral" position at a large angle (e.g., one position at approximately 90° or two positions at 60°) to the direction of the headboard device (car); 2) a "cocked" position at a shallow angle (e.g., 20°) to the direction of the headboard device; and 3) a "locked" position at a medium angle (e.g., 45°) to the direction of the headboard device. The alternating direction flipper locking mechanism 300 is configured such that the locked position is closer to the neutral position than the cocked position. When the headboard device is hoisted, the alternating direction flipper locking mechanism 300 can lock the device at its uppermost position. In some applications, the headboard device can be locked at intermediate (reef) positions.

The magnet assembly 340 is configured such that the housing 310 has at least four housing magnets disposed therein. In detail, three or four of the housing magnets have a polarity that is opposite (e.g., "North-South") the polarity of the flipper magnet at each of the above flipper positions—neutral (one or two positions), cocked, and locked—resulting in an attractive force between such magnets. One remaining housing magnet has a polarity the same (e.g., "North-North") as the polarity of the flipper magnet at a position that pushes the flipper 320 into the nearest neutral position.

As noted above, the alternating direction flipper locking mechanism 300 can be configured with a double track along which the headboard device travels in a upward and downward direction. As the headboard device is hoisted, initial position of the flipper 320 corresponds to the final position from the previous operation (see FIG. 20). As the headboard device travels along the tracks, the flipper 320 is deflected and drags across the ramp (see FIG. 21). When the flipper 320 passes the ramp and the leftmost housing magnet, the flipper 320 is pulled into the cocked position by the cocked position housing magnet, which is positioned at approximately 20° with respect to a centerline of the housing 310 (see FIG. 22).

The headboard device is then eased downward (right to left). As the device moves downward, the notch of the cocked flipper 320 contacts the corresponding surface of the ramp (see FIG. 23). Then, the flipper 320 is engaged with the headboard device (see FIG. 24).

Figure 25:
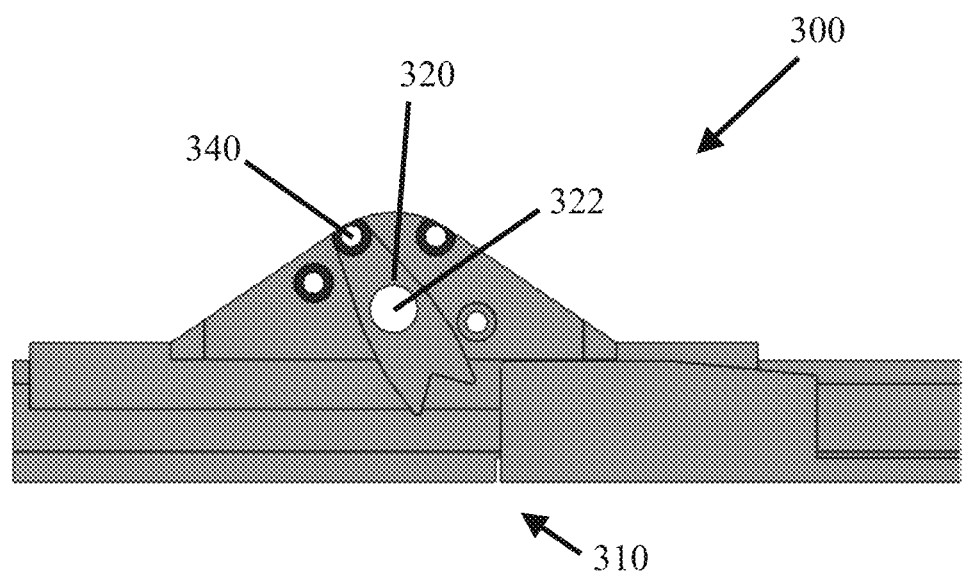
Figure 26:
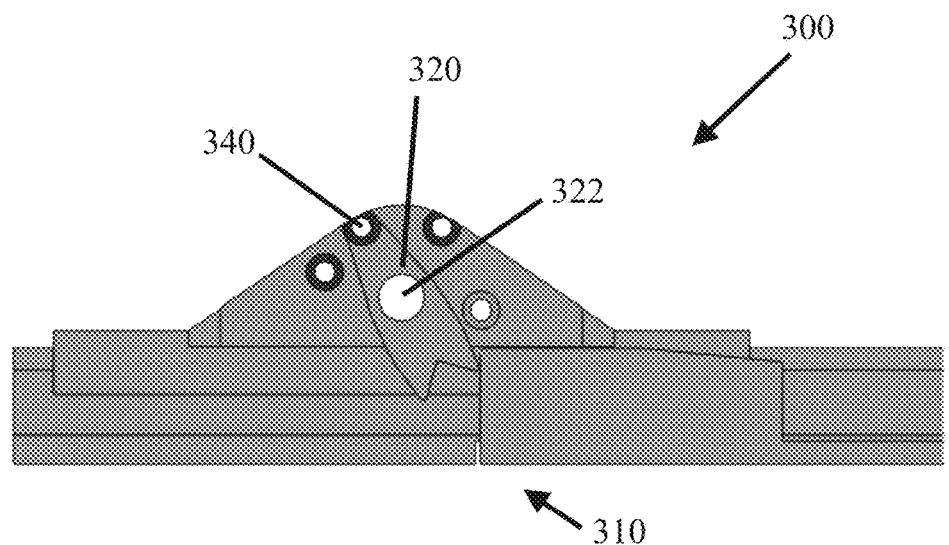
Figure 27:
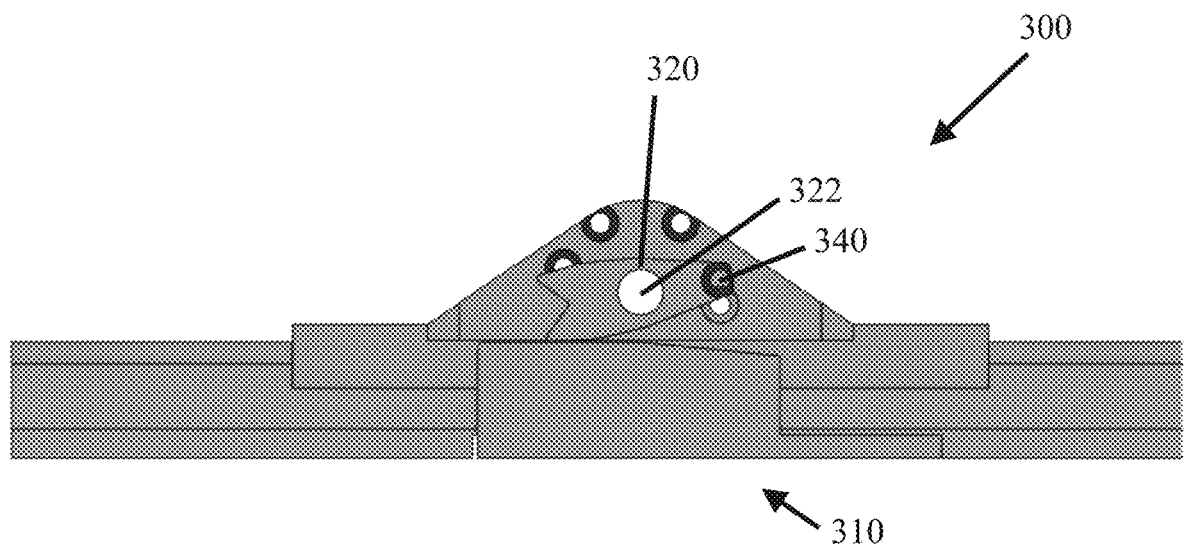
Figure 28:
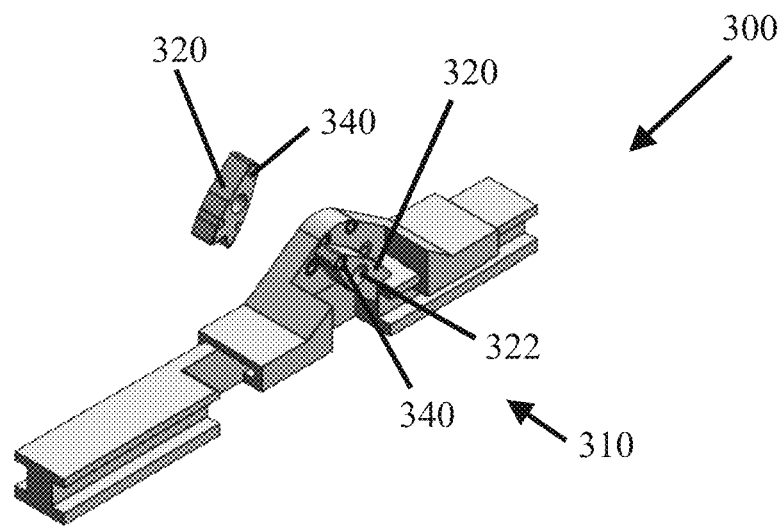
FIGS. 28-38 include views of an alternating direction flipper locking mechanism with a single track according to embodiments of the present disclosure.
Figure 29:
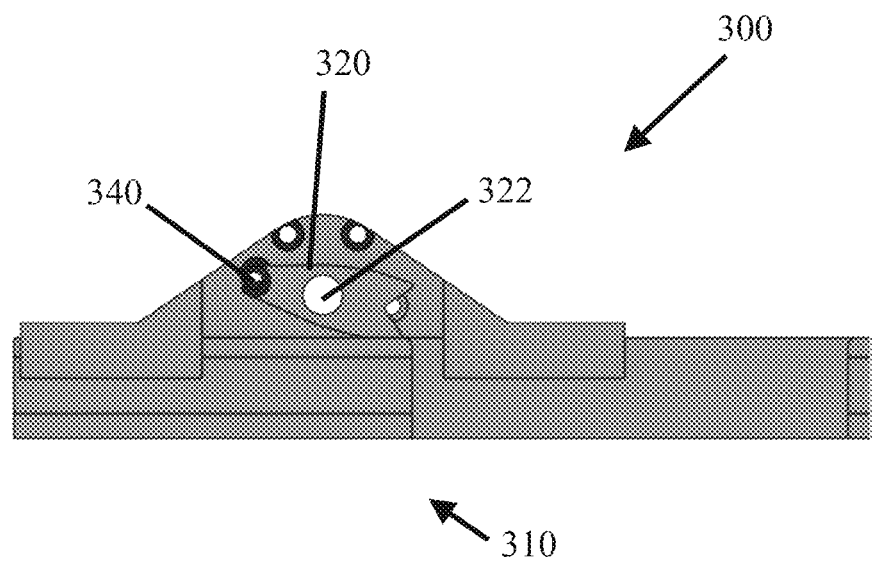
Figure 30:
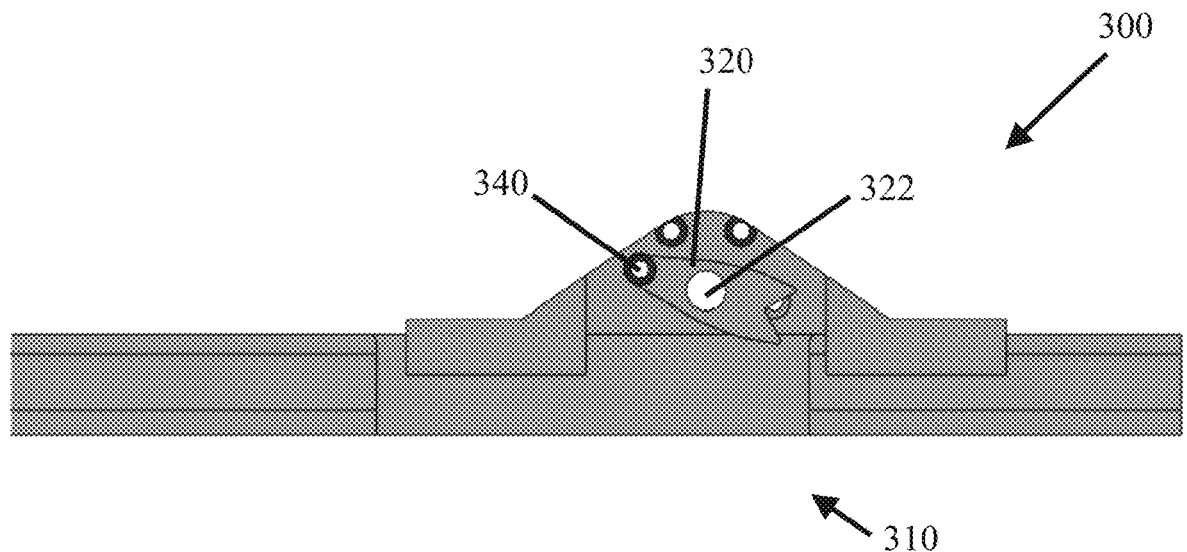
Figure 31:
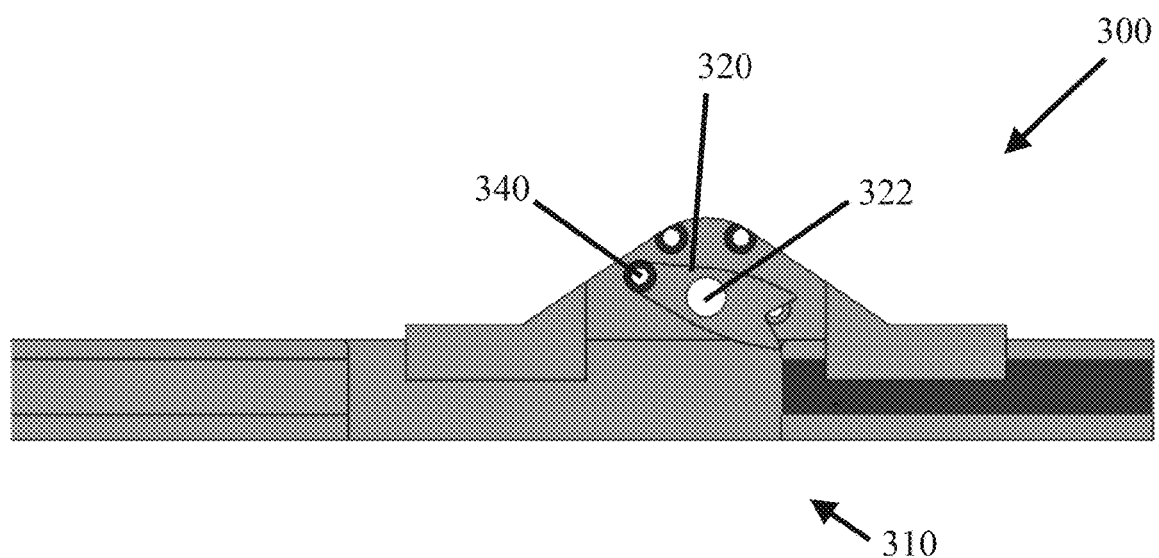
Figure 32:
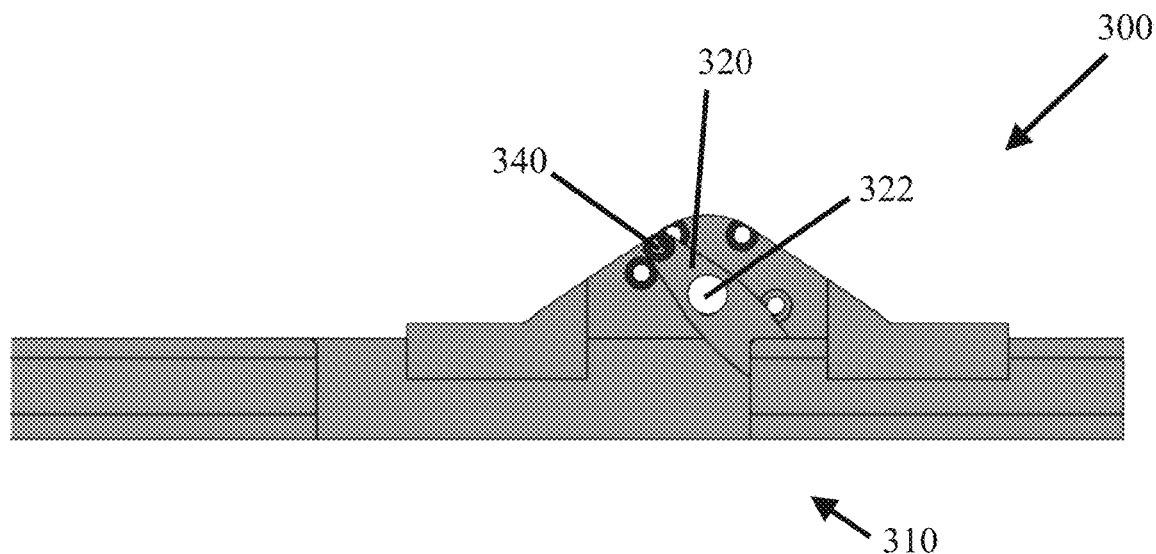

To unlock the alternating direction flipper locking mechanism 300, the headboard device is hoisted (left to right) (see FIG. 25). As the flipper 320 passes the ramp, the neutral position housing magnet overlaps the flipper magnet and moves the flipper 320 into the neutral position (see FIG. 26). Once the flipper 320 is in the neutral position, the headboard device is free to move downward (right to left) past the ramp (see FIG. 27).

As the flipper 320 passes the ramp, the flipper 320 contacts the ramp causing the flipper 320 to rotate to a position approximately aligned with the direction of the headboard device, except offset 180° from its direction when previously in the cocked position. After the flipper 320 passes the ramp, the repelling housing magnet (colored in green) "repels" the flipper magnet to the neutral position, or one of the neutral positions if multiple neutral positions exist (e.g., approximately 90° or approximately 60° with respect to a centerline of the housing 310). At this time, the headboard device is ready to be hoisted again, and the locking operation can be repeated.

Alternatively, the alternating direction flipper locking mechanism 300 can be configured with a single track along which the headboard device travels in a upward and downward direction. In this case, as the headboard device is hoisted (left to right), the flipper 320 contacts and is dragged on the single track (see FIG. 29). A "locking pocket" is illustrated near the bottom of the track in FIG. 29.

When the flipper 320 passes the ramp and the locking pocket at the top of the mast (see FIG. 30), it is pulled into the cocked position by the cocked position housing magnet, which is positioned at approximately 20° with respect to a centerline of the housing 310. The headboard device is then eased downward (right to left). As the device moves downward, the notch of the cocked flipper 320 contacts the corresponding surface of the ramp (see FIG. 31). Then, the flipper 320 is engaged with the headboard device (see FIG. 32).

Figure 33:
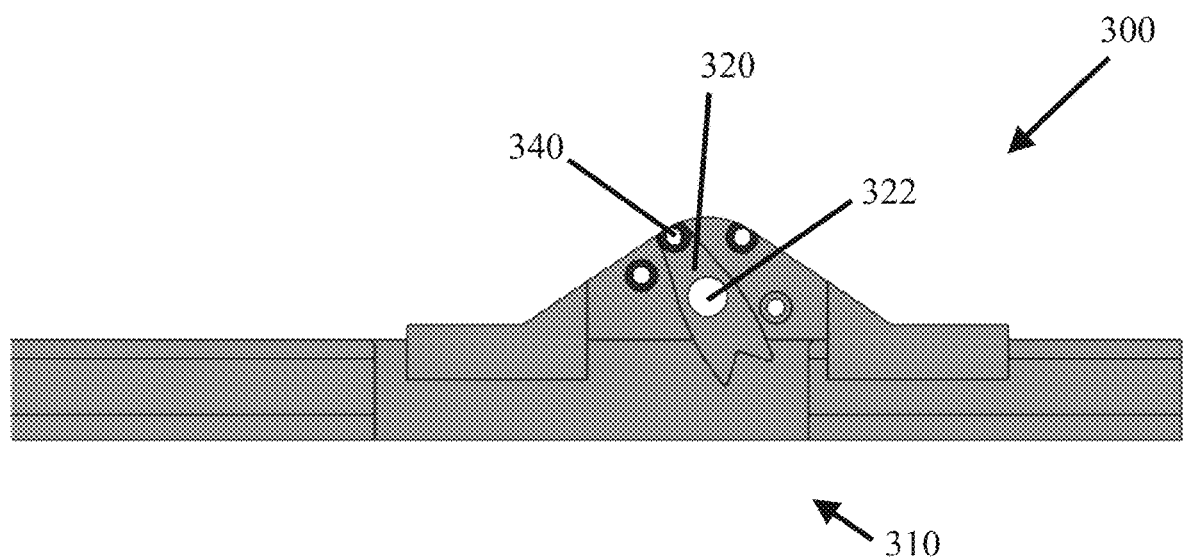
Figure 34:
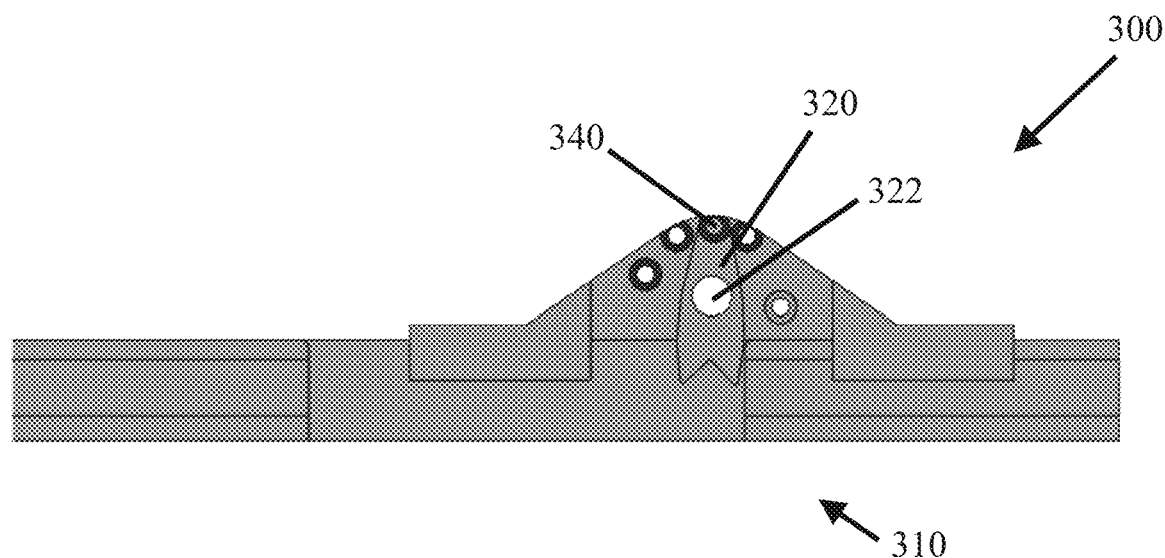
Figure 35:
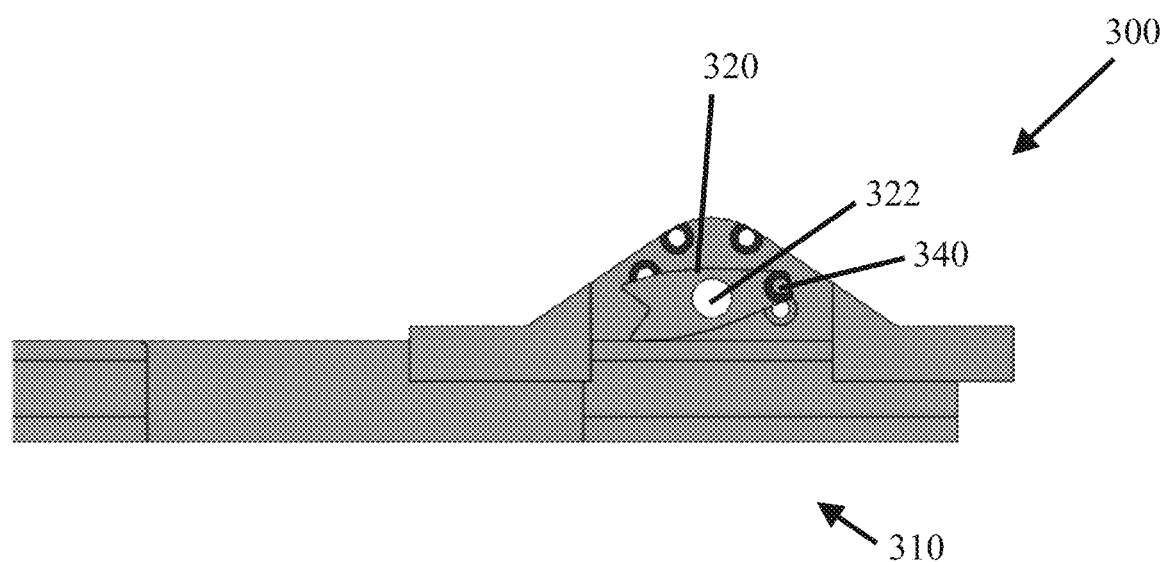
Figure 36:
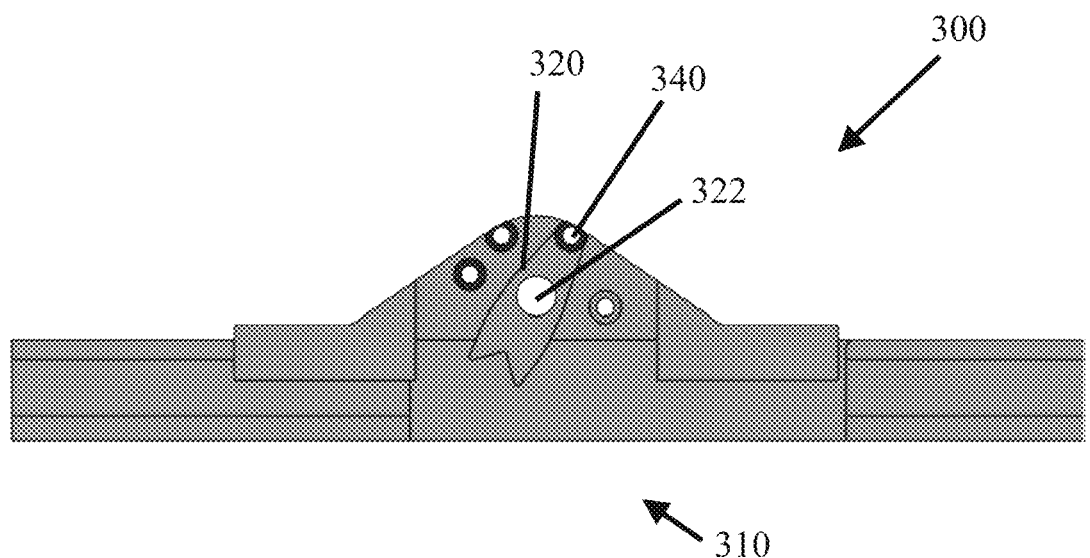

To unlock the alternating direction flipper locking mechanism 300, the headboard device is hoisted (left to right) (see FIG. 33). As the flipper 320 passes the ramp, the neutral position housing magnet overlaps the flipper magnet and moves the flipper 320 into the neutral position (see FIG. 34). Once the flipper 320 is in the neutral position, the headboard device is free to move downward (right to left) past the locking pocket (see FIG. 35).

As the flipper 320 passes the locking pocket, contact with the track causes the flipper 320 to rotate to a position approximately aligned with the direction of the headboard device, except offset 180° from its direction when previously in the cocked position. When the headboard device reaches either the next reef position or the locking pocket at the lower end of the track, the repelling housing magnet (colored in green) "repels" the flipper magnet to the neutral position (See FIG. 36), or one of the neutral positions if multiple neutral positions exist (e.g., approximately 90° or approximately 60° with respect to a centerline of the housing 310). At this time, the headboard device is ready to be hoisted again, and the locking operation can be repeated.

Figure 37:
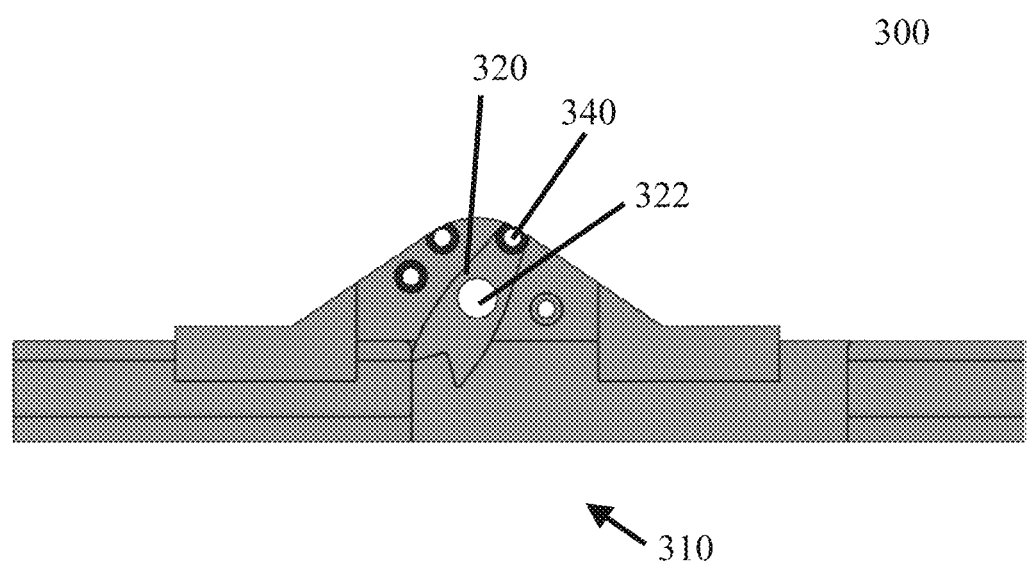
Figure 38:
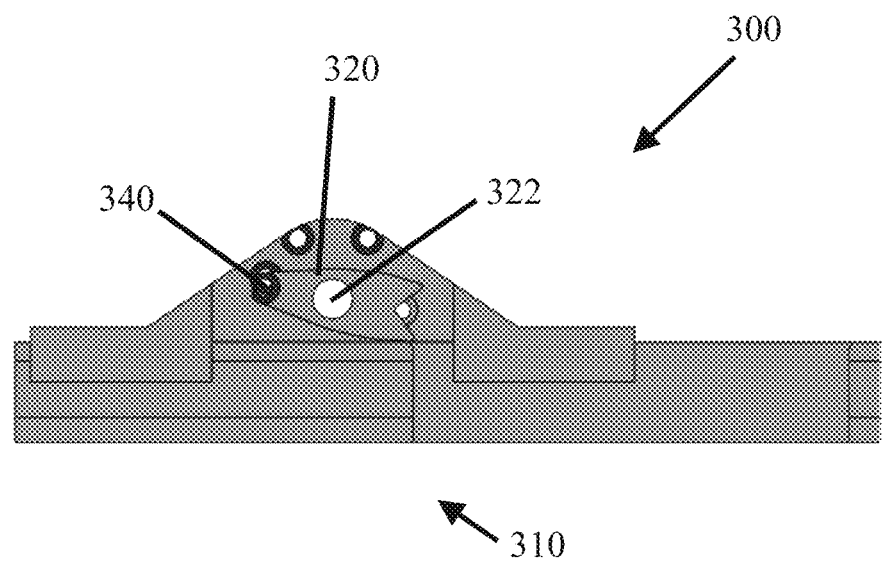

When the headboard device is hoisted again, the flipper 320 contacts the edge of the locking pocket (see FIG. 37). After the flipper 320 moves out of the area of the locking pocket, the flipper 320 drags along the system ready to repeat the locking operation when it again reaches the locking pocket at the top of the mast (see FIG. 38).

FIGS. 39-43 include views of a magnetic unlock prevention mechanism 400 according to embodiments of the present disclosure. Similar to the locking mechanisms described above, the forces of magnetic attraction and repulsion resulting from the magnet assembly 440 are used to control the locking action of a flipper 420.

The magnetic unlock prevention mechanism 400 can be installed to prevent inadvertent unlocking of an automatic lock, e.g., a lock in a yacht headboard device (car). For example, when a halyard is held in a headboard device by an automatic locking device, the halyard can be inadvertently unlocked by an upload that moves the locking slug above the flipper, allowing the locking flipper to move into a neutral or unlocking position. An unlock prevention system is required to prevent this phenomenon.

As shown in FIGS. 39-43, the magnetic unlock prevention mechanism 400 includes two flippers 420: 1) an "unlock preventing flipper" 420a and 2) a "stop flipper" 420b. Both flippers 420 are fitted with internal magnets whose polarity is opposite (attracting) of a polarity of a housing magnet mounted in the housing 410, which has at least one track along which a headboard device of a sailing vessel travels in an upward and downward direction. The housing magnet 412 is represented by a square object mounted in the track in FIGS. 39-43 (referred to hereinafter as "track-mounted magnet").

Figure 39:
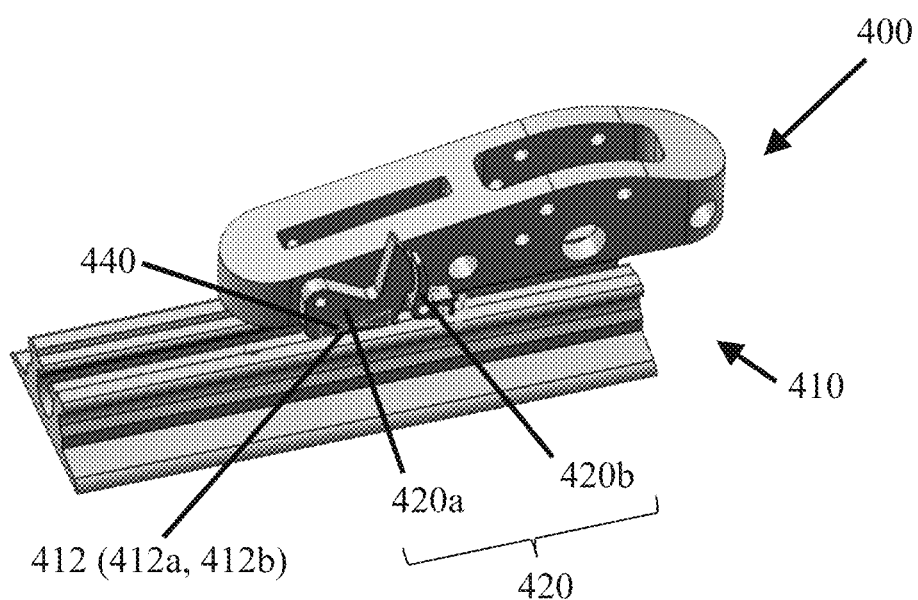
FIGS. 39-43 include views of a magnetic unlock prevention mechanism according to embodiments of the present disclosure.
Figure 40:
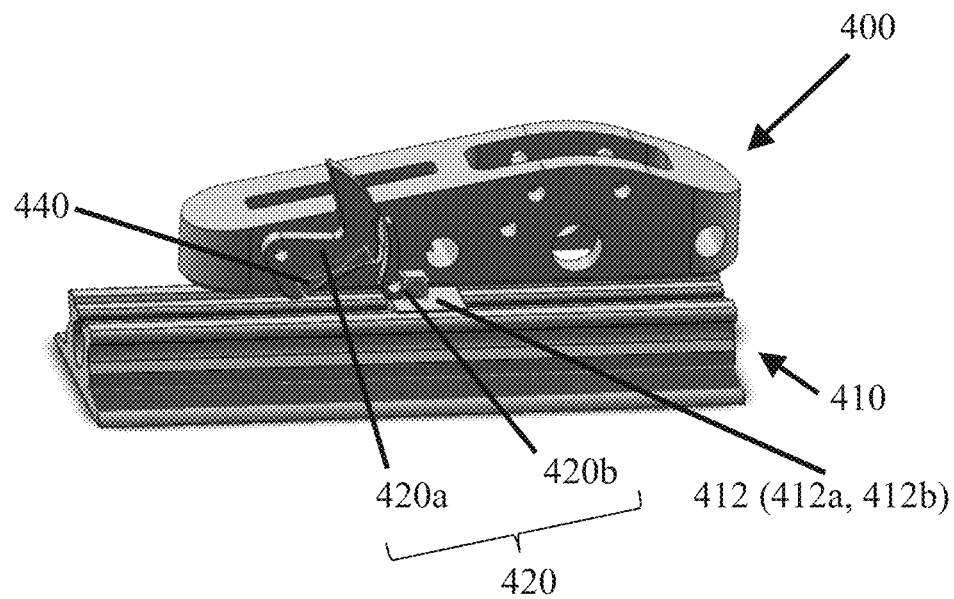
Figure 41:
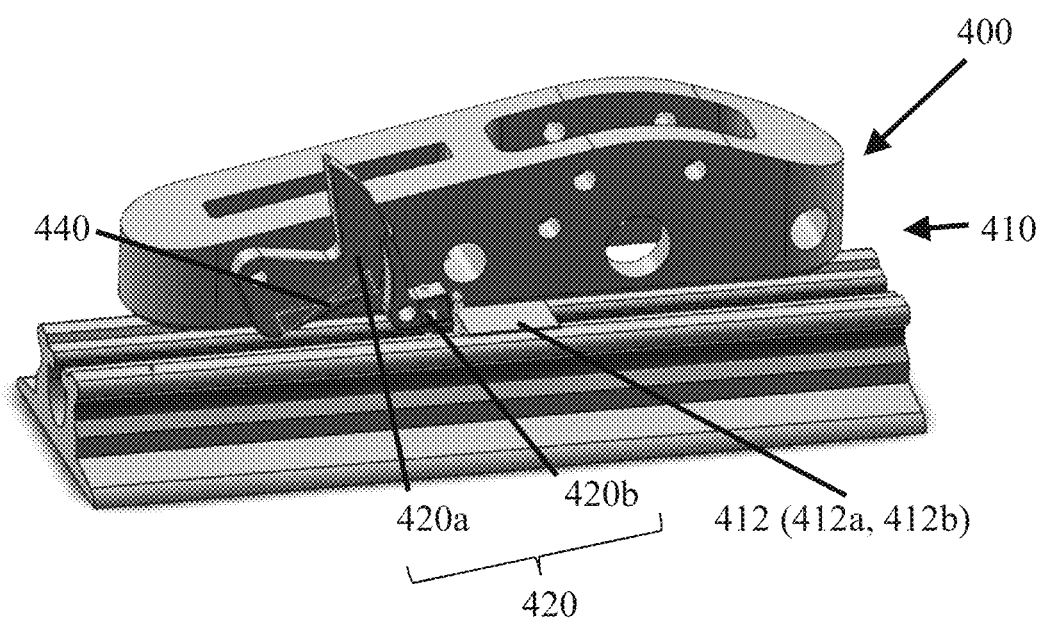
Figure 42:
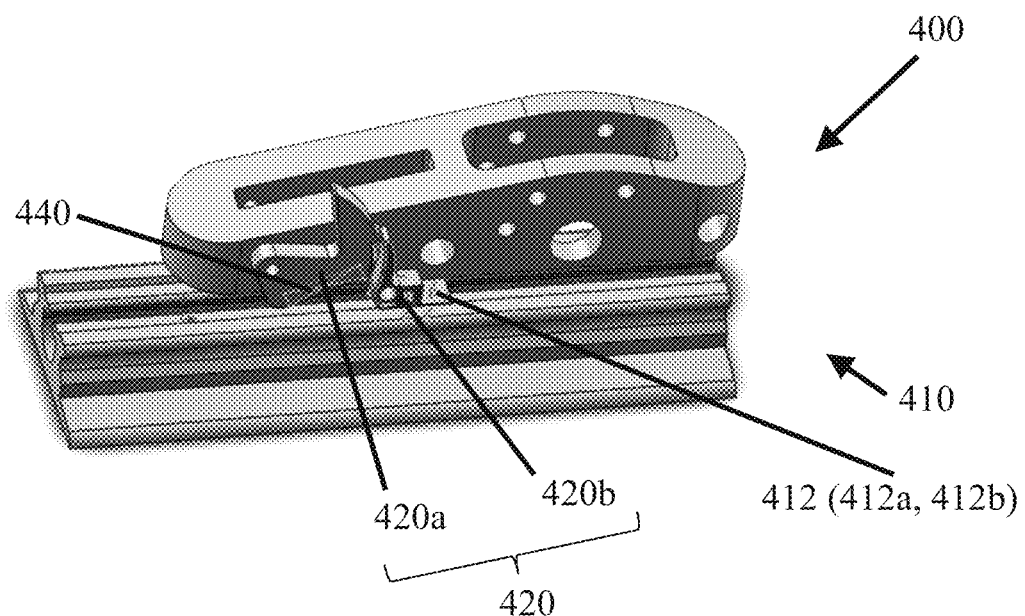
Figure 43:
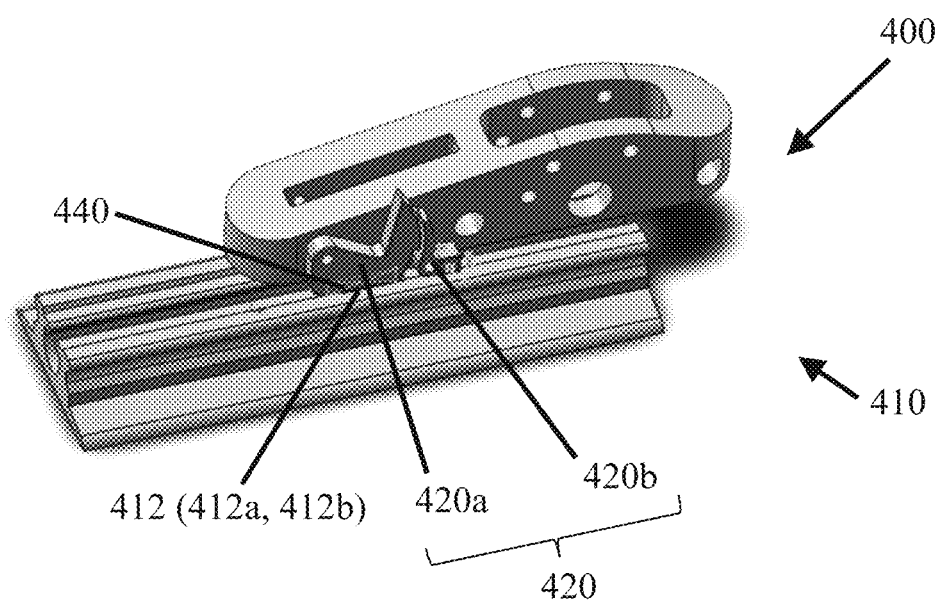
Figure 44:
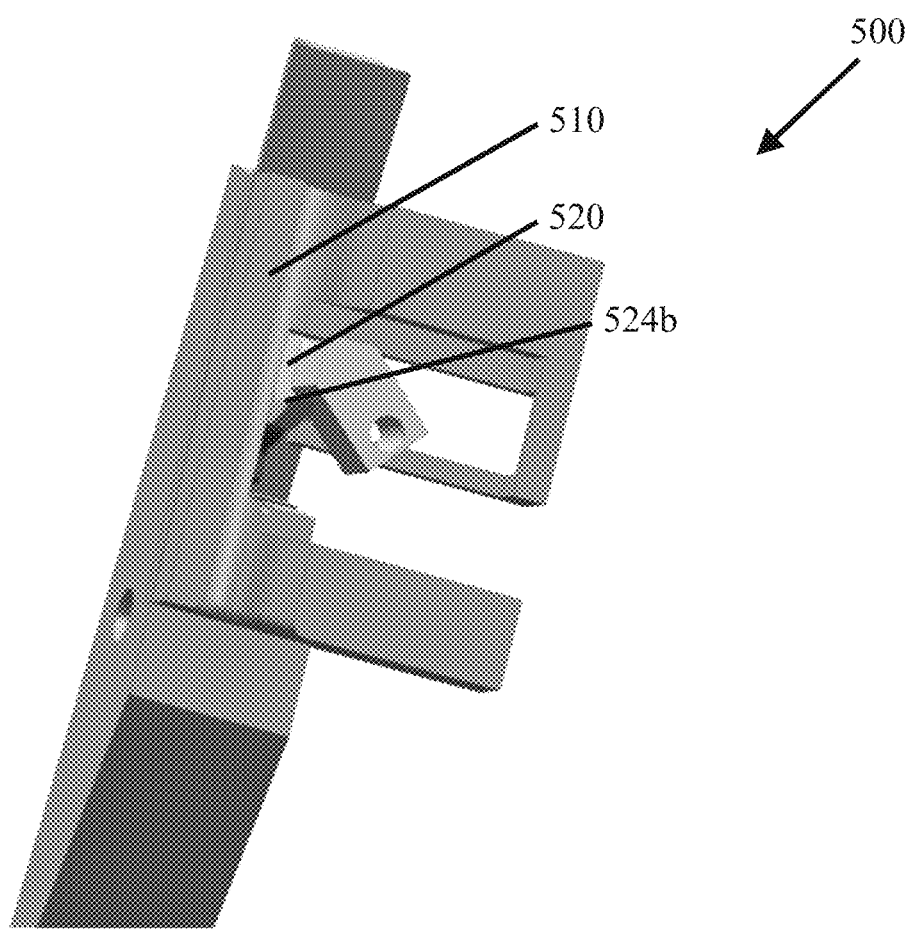
FIGS. 44-60 include views of an automatic upstop locking mechanism according to embodiments of the present disclosure.
Figure 45:
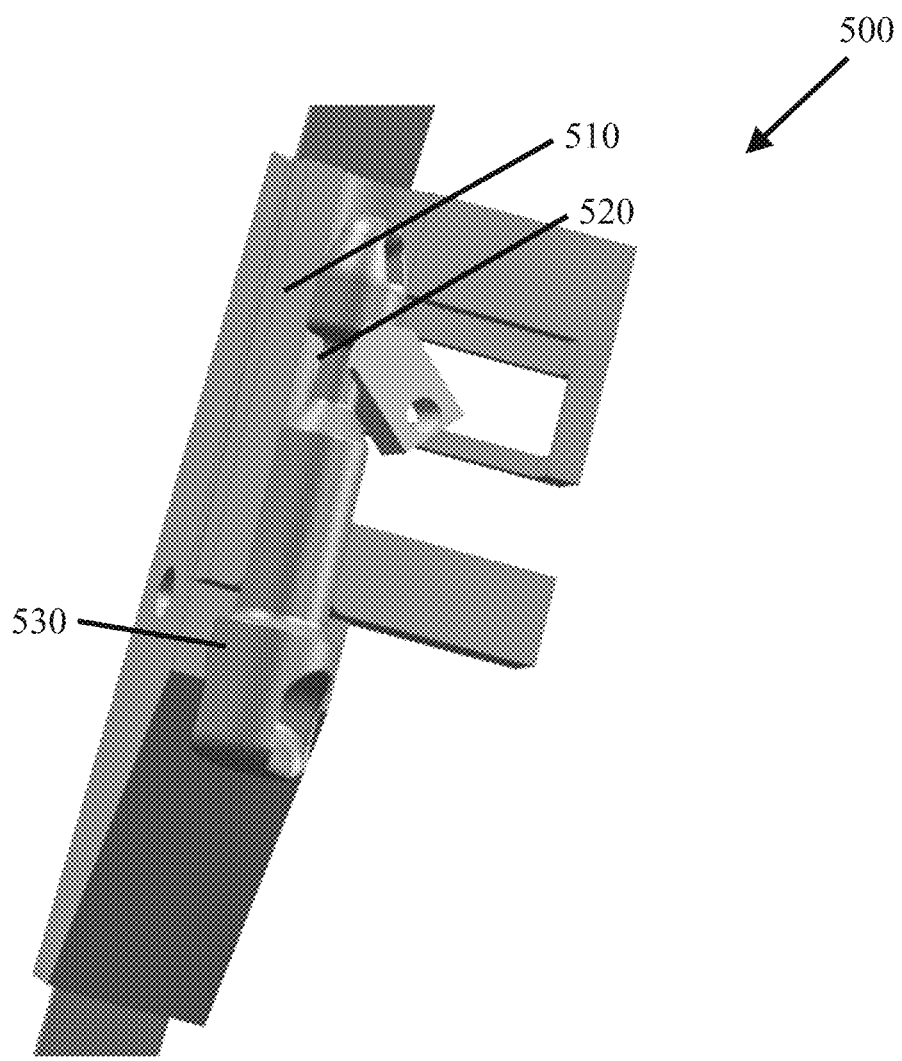
Figure 46:
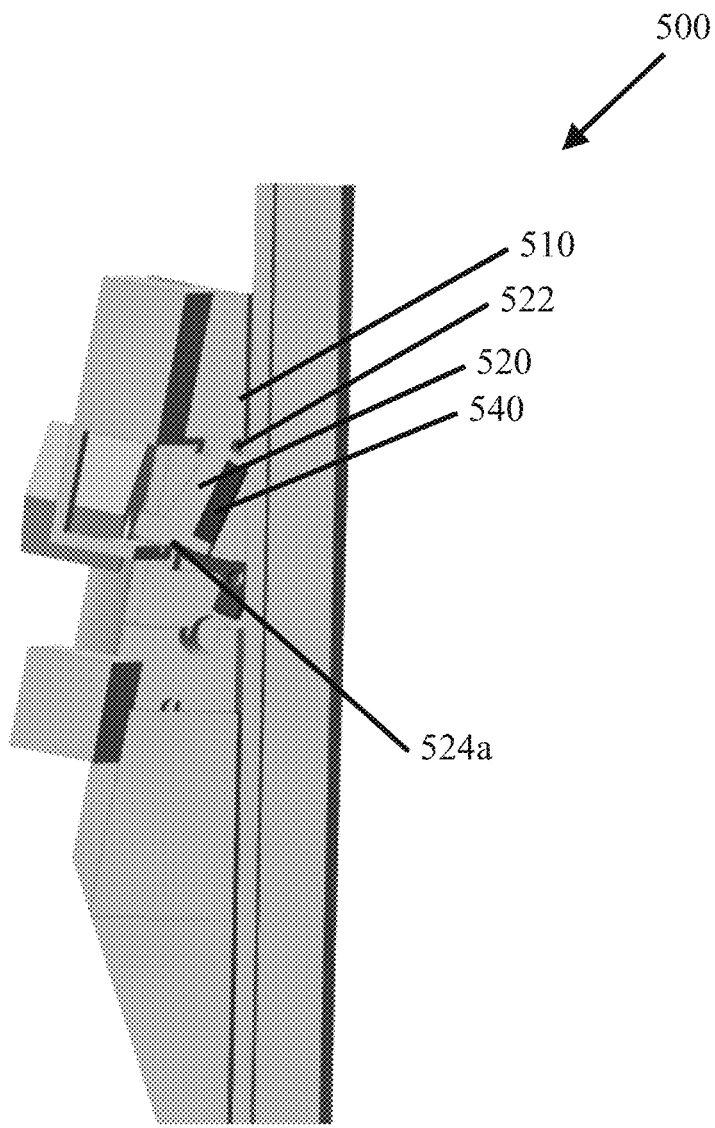
Figure 47:
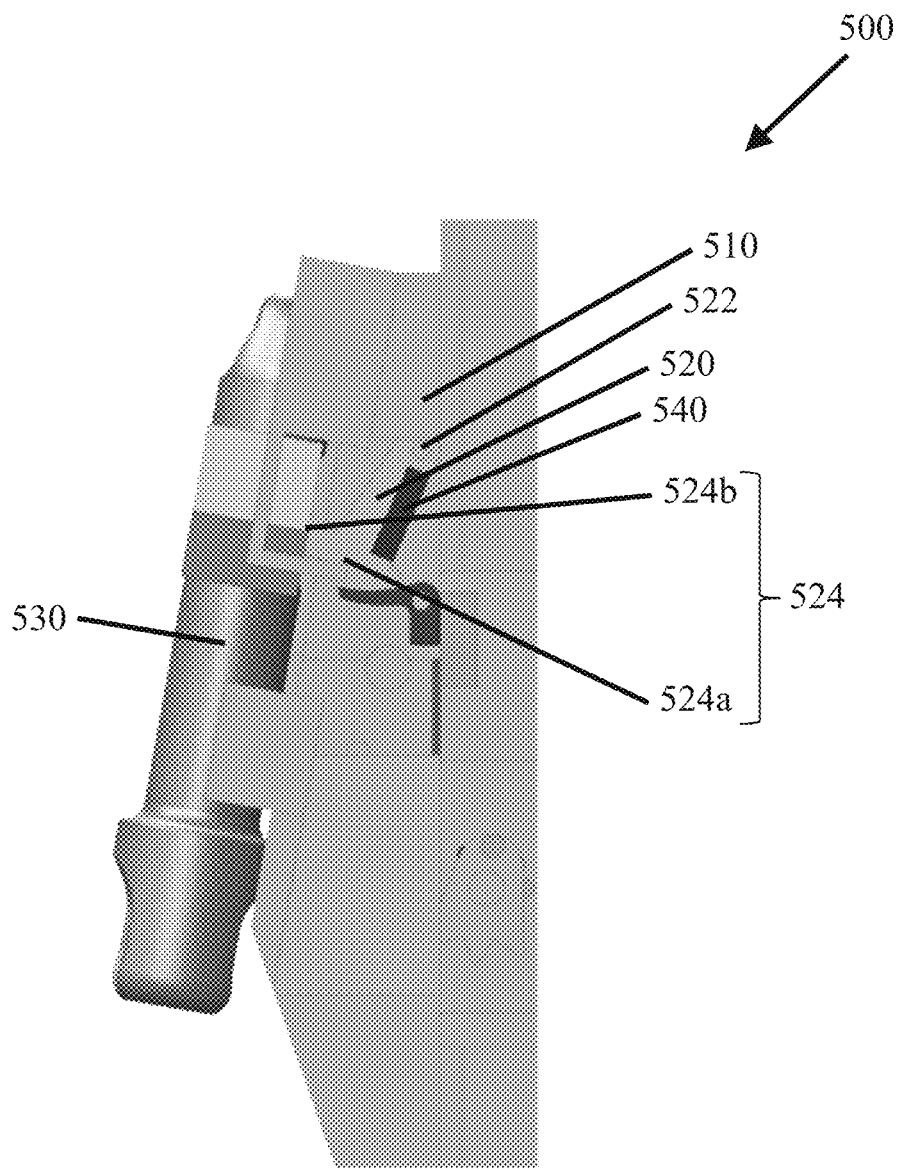
Figure 48:
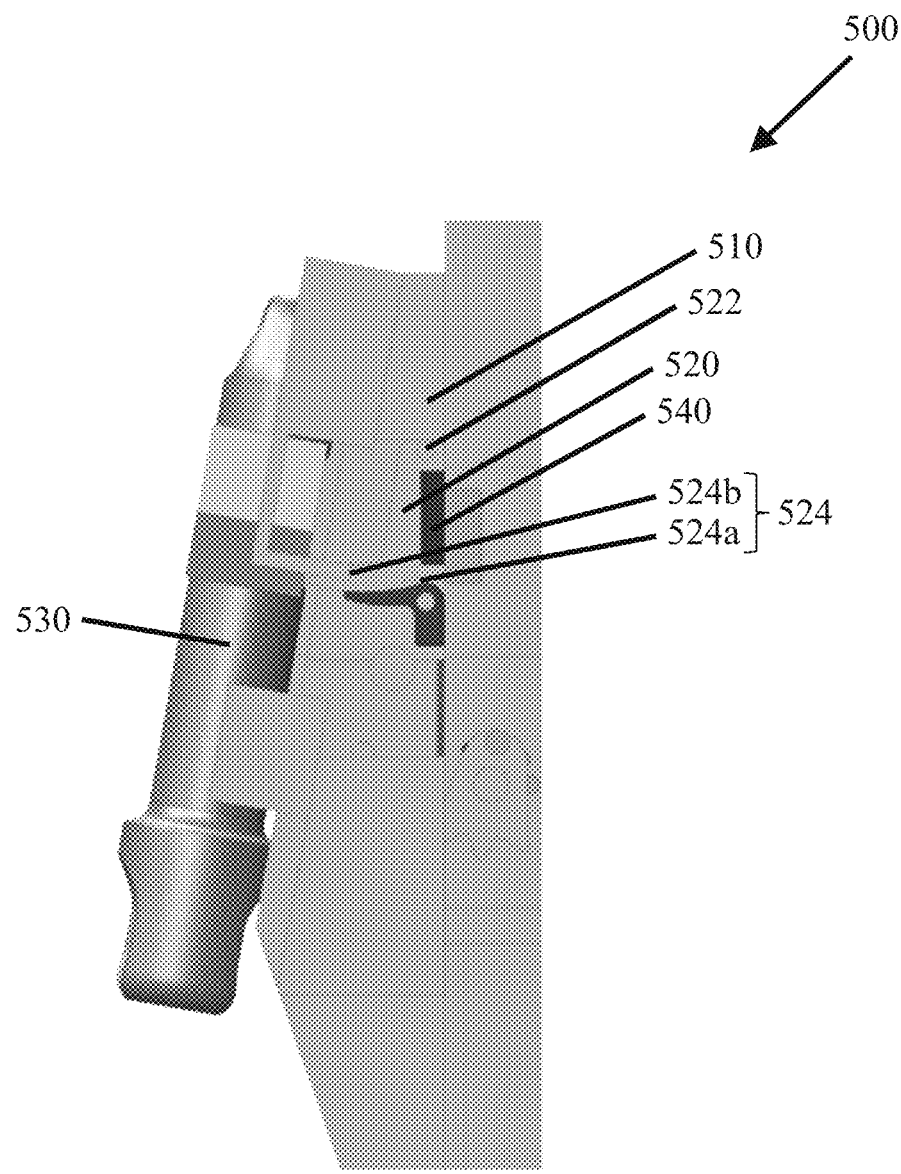
Figure 49:
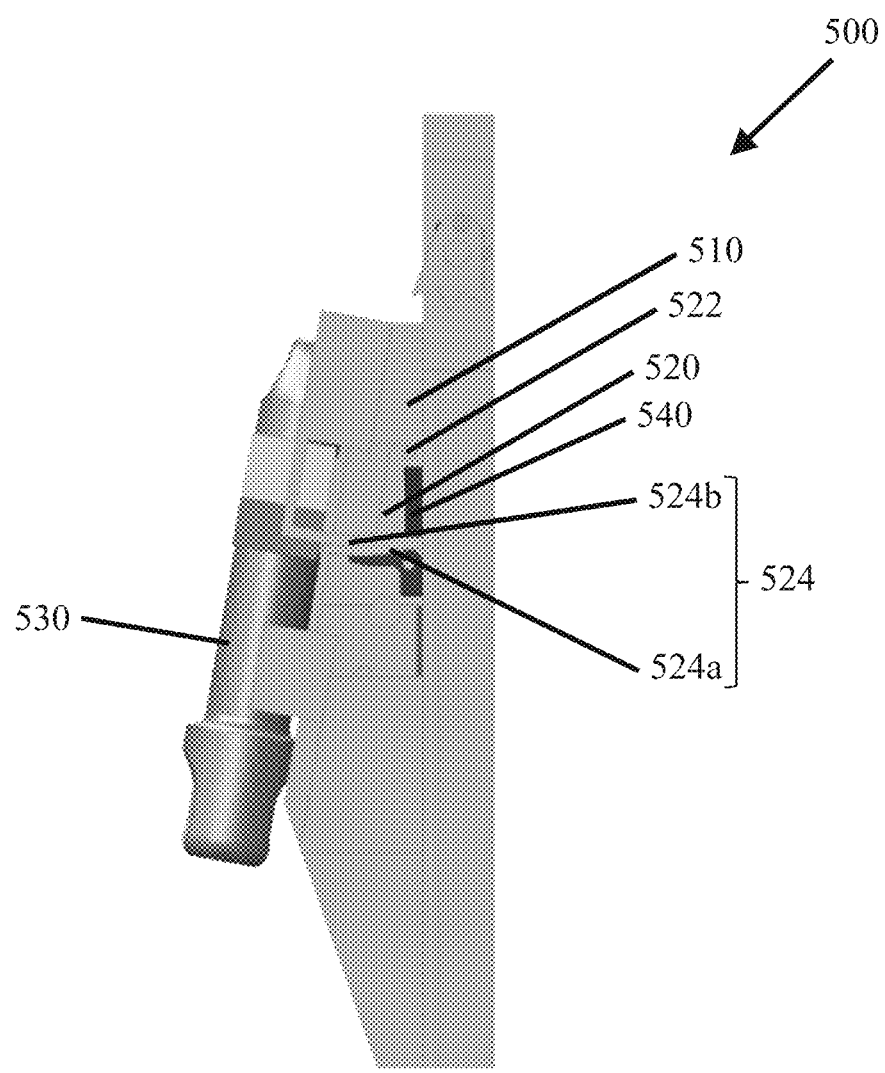
Figure 50:
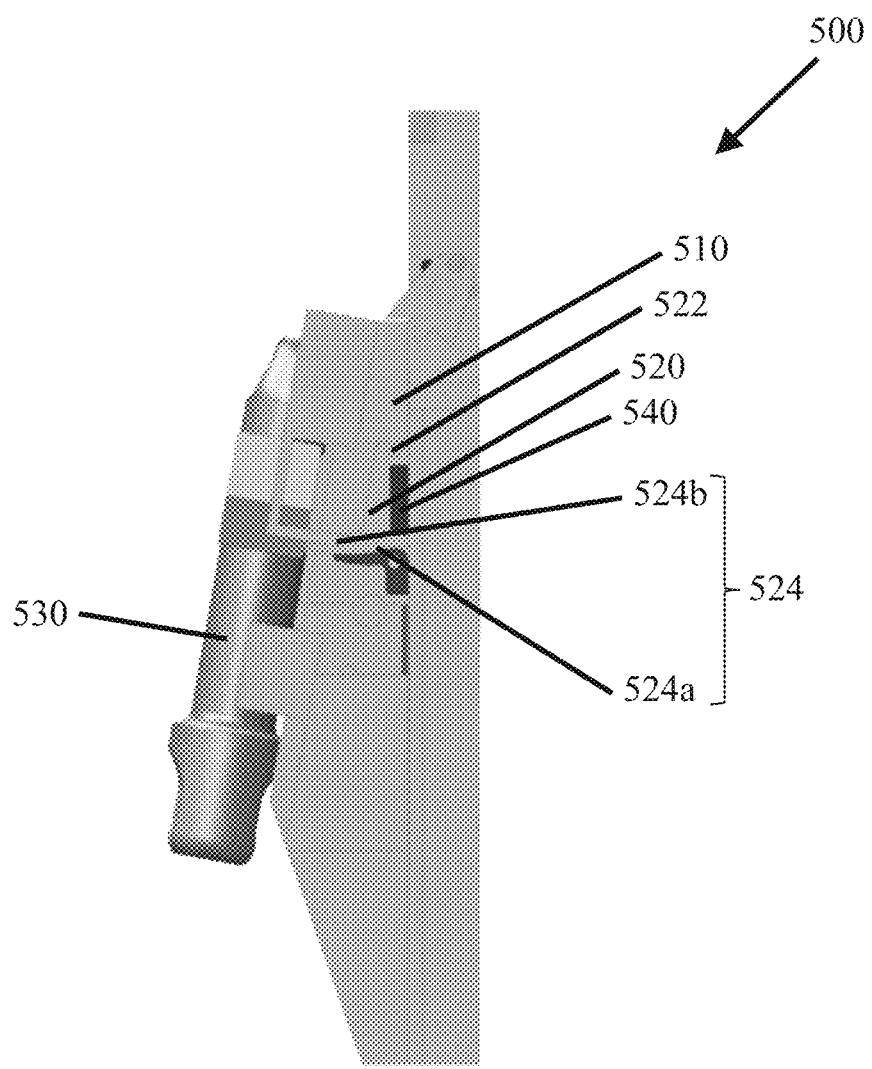
Figure 51:
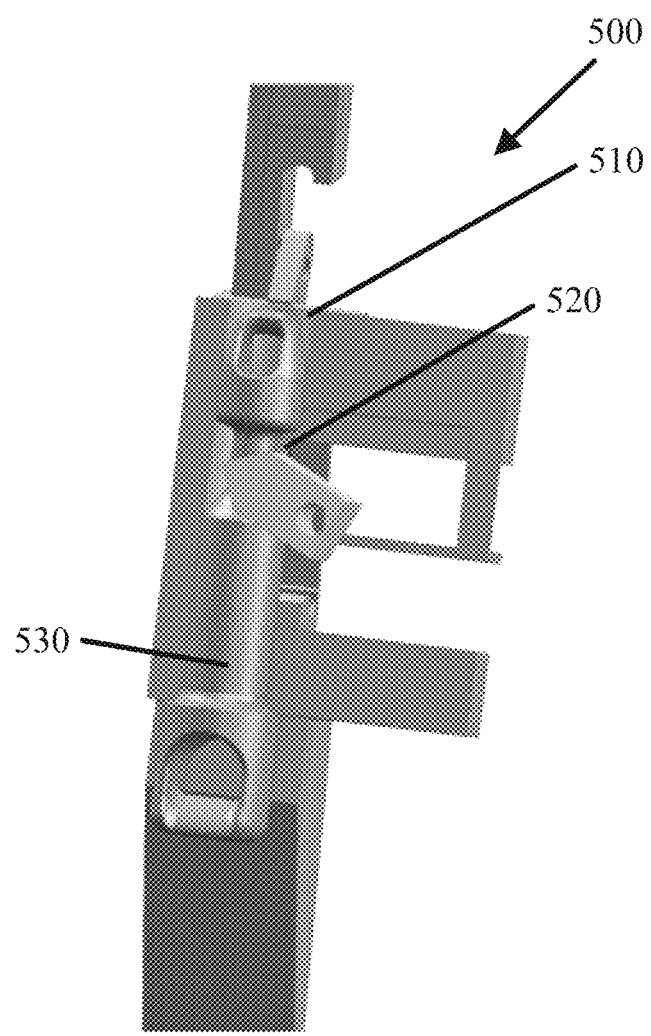
Figure 52:
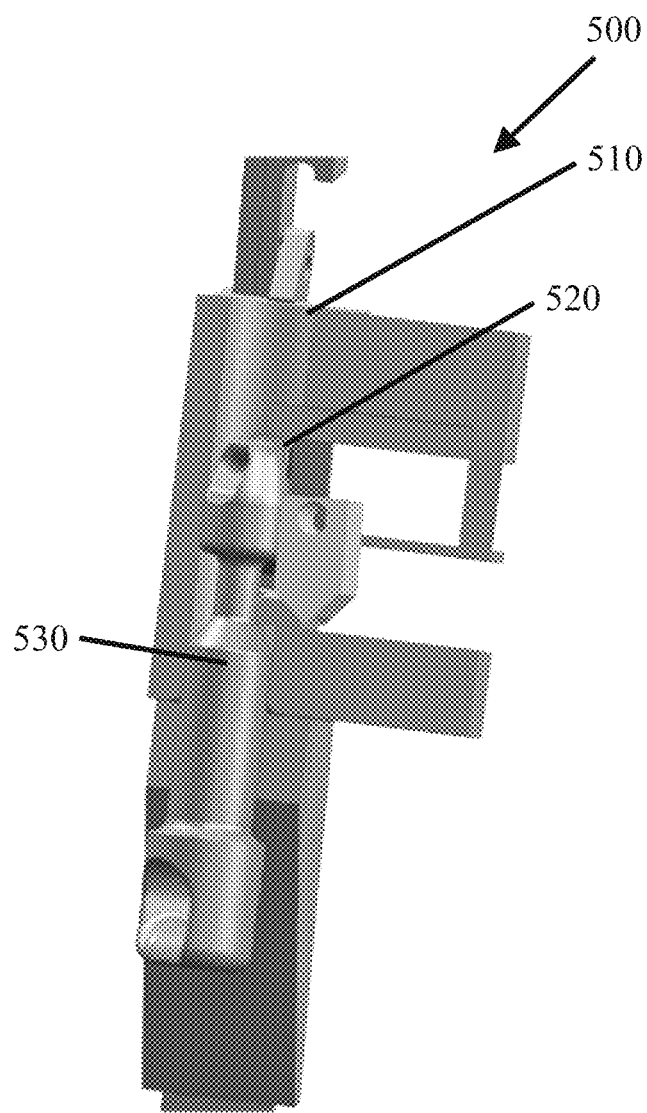

When the sail is down, the unlock preventing flipper 420a and the stop flipper 420b are stowed (see FIG. 39). The flippers 420 remain stowed as the sail is hoisted (right to left) into the automatic lock below the track-mounted magnet 412. As the sail is further hoisted (right to left), the unlock preventing flipper 420a passes over the track-mounted magnet 412. Although the poles on the unlock preventing flipper 420a and track-mounted magnet 412 are opposite (attracting), the force field created by the track mounted magnet 412 effectively changes polarity and "pushes" the unlock preventing flipper 420a into an "unlock preventing position" (see FIG. 40).

Notably, when hoisting the halyard into the halyard lock of the car, a spring (not shown) may be installed on the strop to hold the halyard in a locked position until the unlock prevention mechanism 400 is deployed. The spring may be a high-load, heat-treated, stainless steel spring, for example. Alternatively, resilient members, such as silicon rubber springs, may be utilized in place of stainless steel springs to save weight and cost.

As the headboard device moves further up the track (right to left), the same "push" phenomenon is caused by the track-mounted magnet 412 and acts on the stop flipper 420b, pushing stop flipper 420b into a position that keeps the unlock preventing flipper 420a from disengaging. (see FIG. 41). This action is enhanced by a magnetic attraction between the unlock preventing flipper 420a and the stop flipper 420b when in their deployed position, which prevents disengagement of the unlock preventing flipper 420a even in cases of vibration and momentum, where the magnetic attraction of the two flippers 420 keeps returning them to the unlock preventing position.

When the sail is taken down, its halyard must be unlocked from the headboard device. To do so, the magnetic unlock prevention mechanism 400 must be disengaged, which occurs when the system passes by the track-mounted magnet 412. When the stop flipper 420b passes over the track-mounted magnet 412, the mutual attraction of the track-mounted magnet 412 and the flipper magnet in the stop flipper 420b stows the stop flipper 420b, preparing the unlock preventing flipper 420a for disengagement/stowage (see FIG. 42). When the unlock preventing flipper 420a passes over the track-mounted magnet 412, the mutual attraction of the track-mounted magnet 412 and the flipper magnet in the stop flipper 420b stows the unlock preventing flipper 420a (see FIG. 43). Once the unlock preventing flipper 420a is stowed, the sail halyard can be unlocked from its automatic lock since its locking flipper is now free to move into its neutral, unlocking position.

Furthermore, the magnetic unlock prevention mechanism 400 may include dual housing magnets mounted in the housing 410. Instead of a single opposite pole (attracting) housing magnet 412, the housing 410 can include a lower opposite pole (attracting) magnet 412a and an upper same pole (repelling) magnet 412b, placed in close vertical proximity with each other.

In detail, the flippers 420 remain stowed as the sail is hoisted (right to left) into the automatic lock below the housing magnets, as noted above. Eventually, the unlock preventing flipper 420a passes over the housing magnets as the sail is further hoisted (right to left). In this position, when the unlock preventing flipper 420a and the stop flipper 420b pass over the upper same pole (repelling) magnet 412b, the unlock preventing flipper 420a and the stop flipper 420b are deployed into the aforementioned "unlock preventing position," which prevents unlocking of the halyard.

Similarly, as the headboard device moves further up the track (right to left), the unlock preventing flipper 420a and the stop flipper 420b remain deployed in the "unlock preventing position" while they pass over the upper same pole (repelling) magnet 412b. As the stop flipper 420b and the unlock preventing flipper 420a pass over the lower opposite pole (attracting) magnet 412a, first the stop flipper 420b and then the unlock preventing flipper 420a are moved to stowed positions. Here, the sail halyard can be unlocked from its automatic lock since its locking flipper is now free to move into its neutral, unlocking position.

It should be understood that while the unlock preventing flipper 420a and stop 420b are shown in FIGS. 39-43 outside the cassette to demonstrate their action for illustration, typically the flippers 420 are installed inside the cassette slot along the centerline of the housing 410 in practice.

FIGS. 44-60 include views of an automatic upstop locking mechanism 500 according to embodiments of the present disclosure. Typically, an "upstop" locking mechanism is remotely engaged (e.g., through a trip line) to set another automatic lock, then automatically retracts once the other automatic lock is engaged (e.g., through the action of a return spring). An example automatic upstop can stop a sailing yacht headboard device (car), which enables the sail halyard to be locked in the headboard device. As a person of ordinary skill in the art would understand, once the halyard is locked, and the halyard is eased slightly, the upstop automatically retracts.

The automatic upstop locking mechanism 500 can be moved into, at least, three principal positions (several intermediate positions are possible as well): 1) a first position that stops the headboard device in the up direction to unlock in the halyard; 2) a second position that stops the headboard device in the down direction to lock the halyard; and 3) a third (neutral) position that allows the headboard device to move unobstructed in either (up or down) direction. The automatic upstop locking mechanism 500 includes a flipper 520 rotatably coupled to a housing 510 by way of a flipper pin 522. The flipper 520 may be formed with a notch 524 including two discrete notch positions. The first upstop notch 524a stops the headboard device as it moves in the up direction to unlock the halyard (first position). The second upstop notch 524b stops the headboard device as it moves in the up direction to lock the halyard (second position). The flipper 520 may also have a neutral position which does not stop the headboard device in either (up or down) direction (third position).

As for the magnet assembly 540, a flipper magnet is embedded in the flipper 520 opposite the notch(es) on the other side of the flipper pin 522. Moreover, the housing 510 may include five housing magnets. Among the housing magnets, three have a polarity that is opposite (e.g., "North-South") a polarity of the flipper magnet, creating attractive forces at the first, second, and third (neutral) flipper positions. The remaining two Housing Magnets (designated in red) have the same polarity (e.g., "North-North") as the polarity of the flipper magnet 520, and are positioned at the ends of the flipper system to repel (i.e., push) the flipper 520 into the first locking position or the third (neutral) position.

Operationally, when the sail is to be taken down, the slug 530 must be pulled up into its locking system to be disengaged. When the slug 530 is pulled into the locking system inside the headboard device, the slug tends to push the headboard device up, preventing the slug 530 from engaging the halyard locking system. The operation requires that the headboard device be held in position until the slug 530 is unlocked from the halyard locking system.

When the headboard device is lowered past the upstop, the upstop is set at the first upstop position (see FIG. 49), whereby movement of the headboard device is stopped in the up direction to lock in the halyard. The first upstop position holds the headboard device while the halyard slug 530 is disengaged (see FIGS. 50-52).

Figure 53:
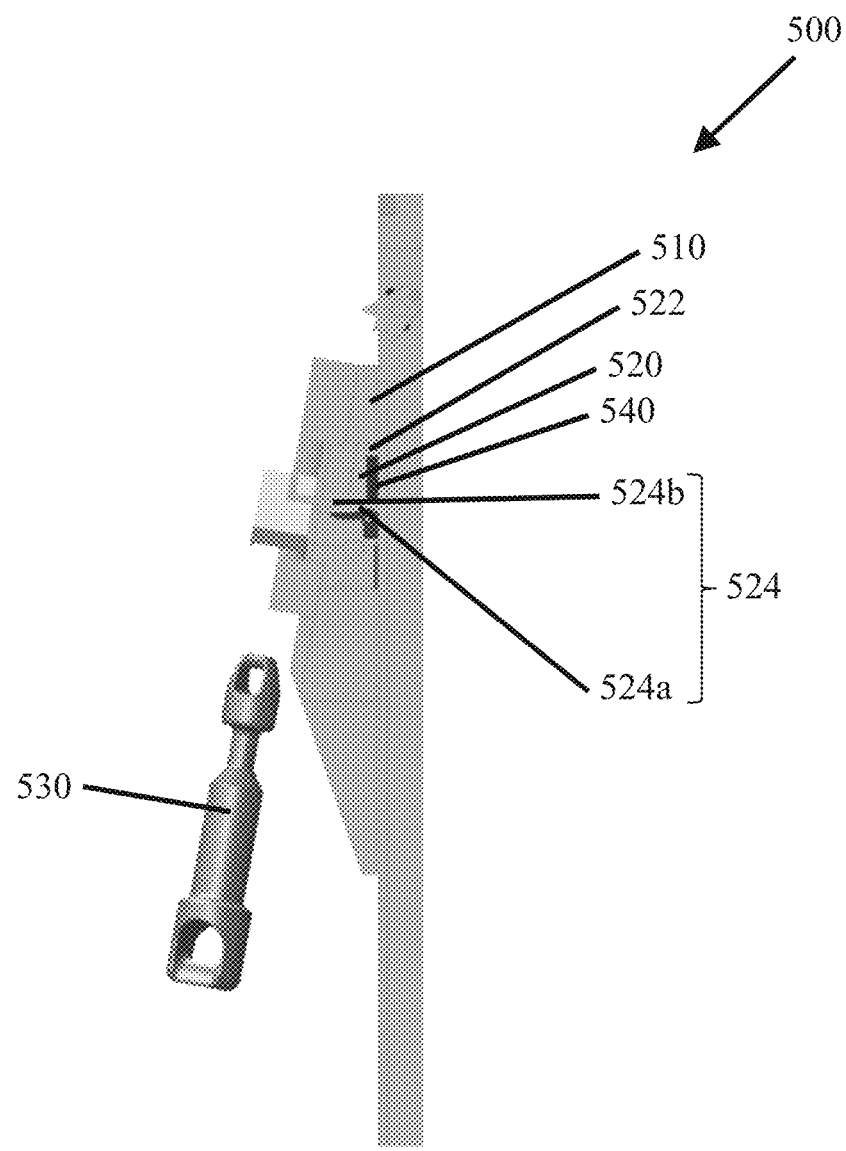
Figure 54:
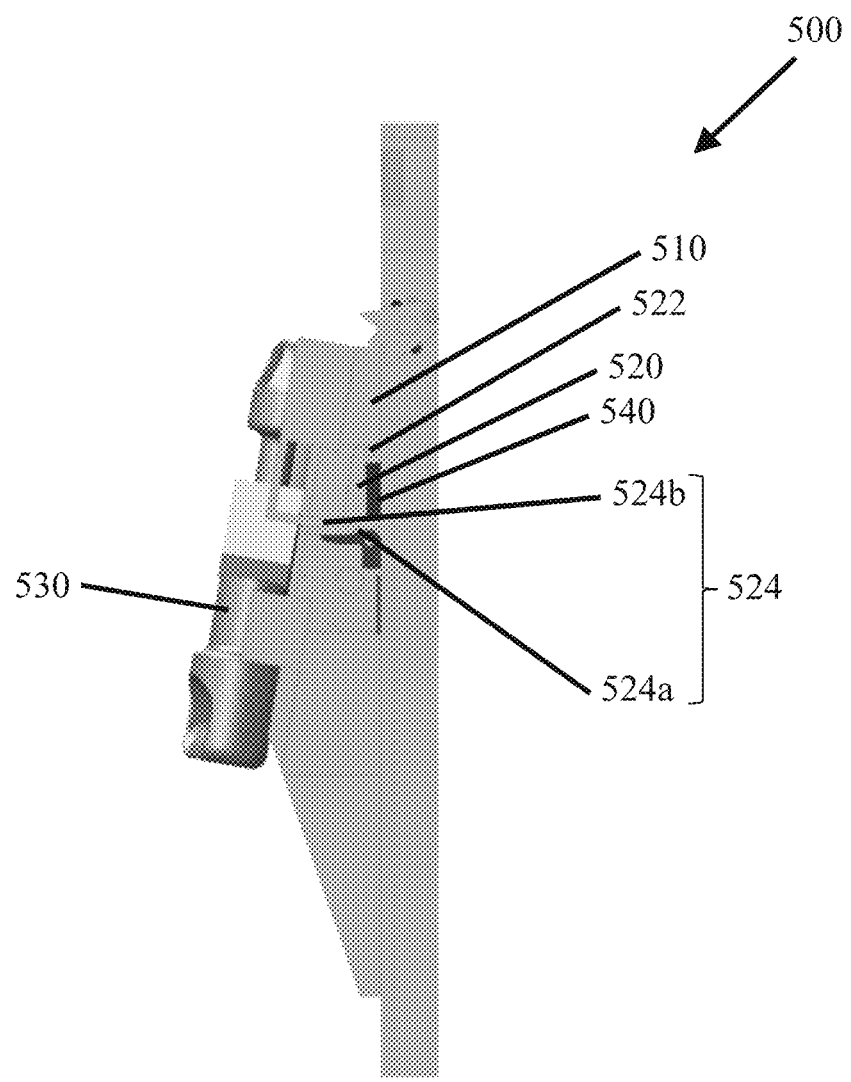
Figure 55:
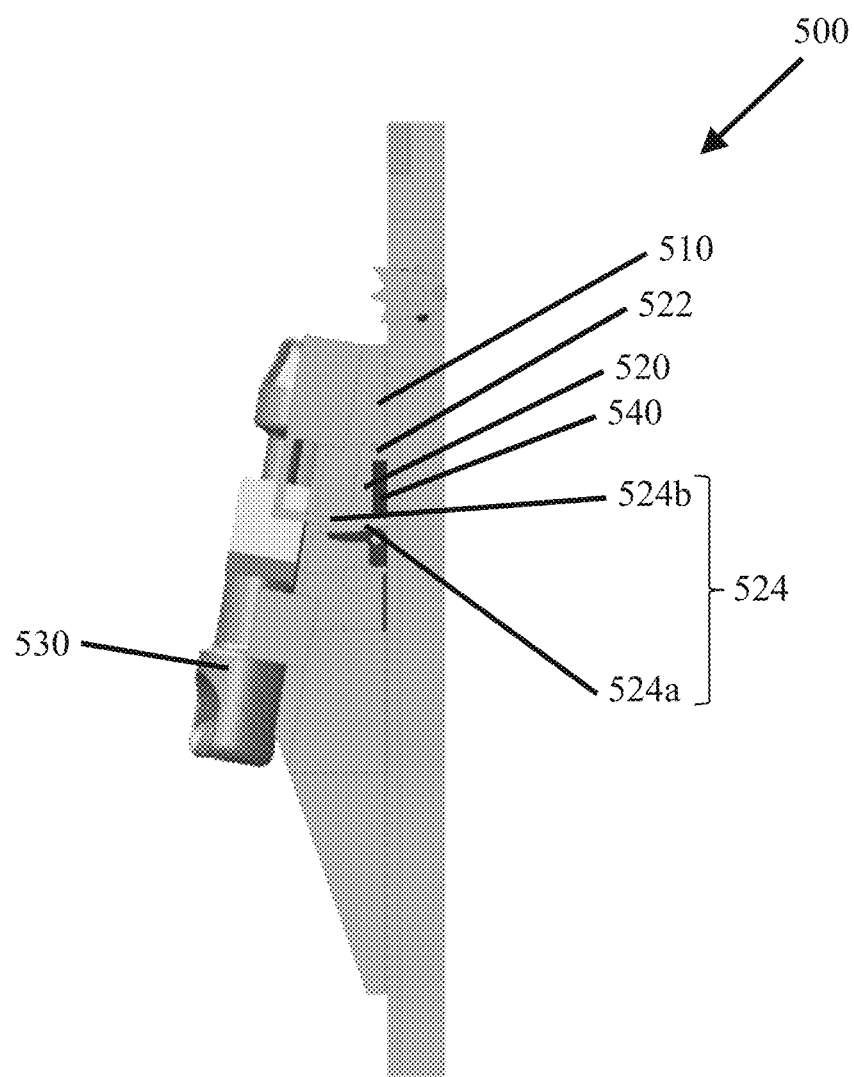
Figure 56:
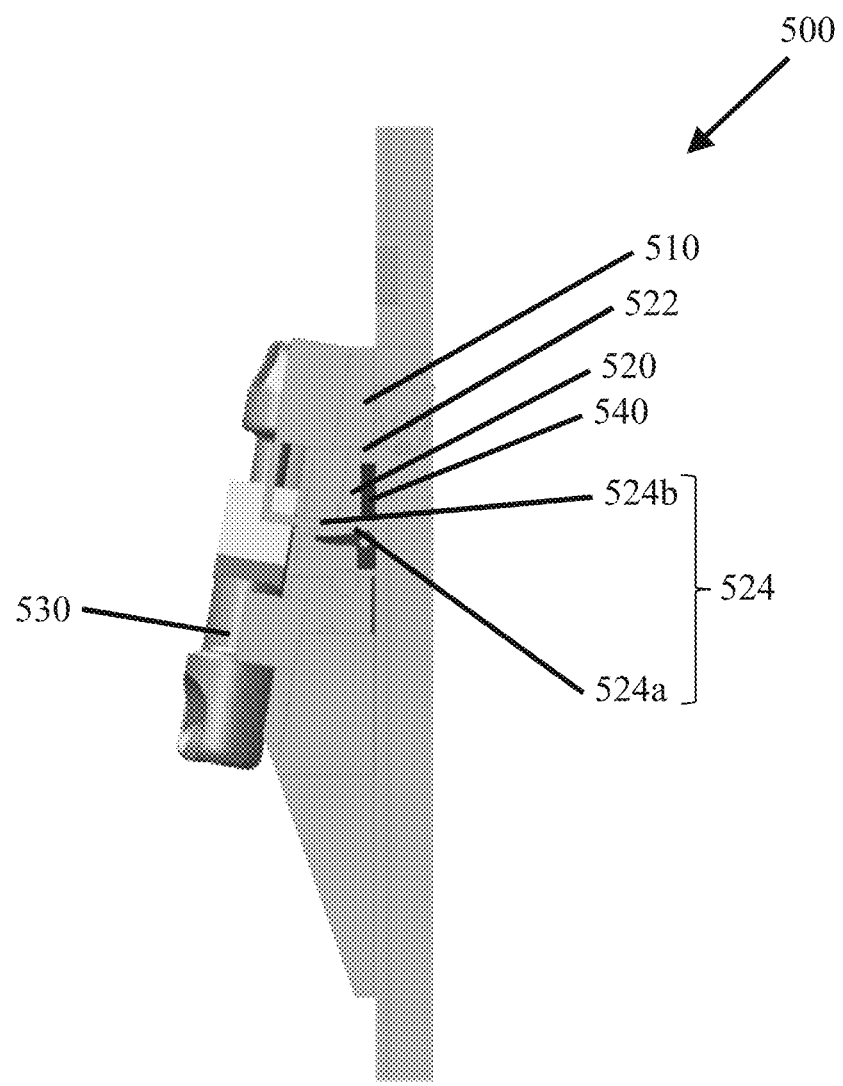
Figure 57:
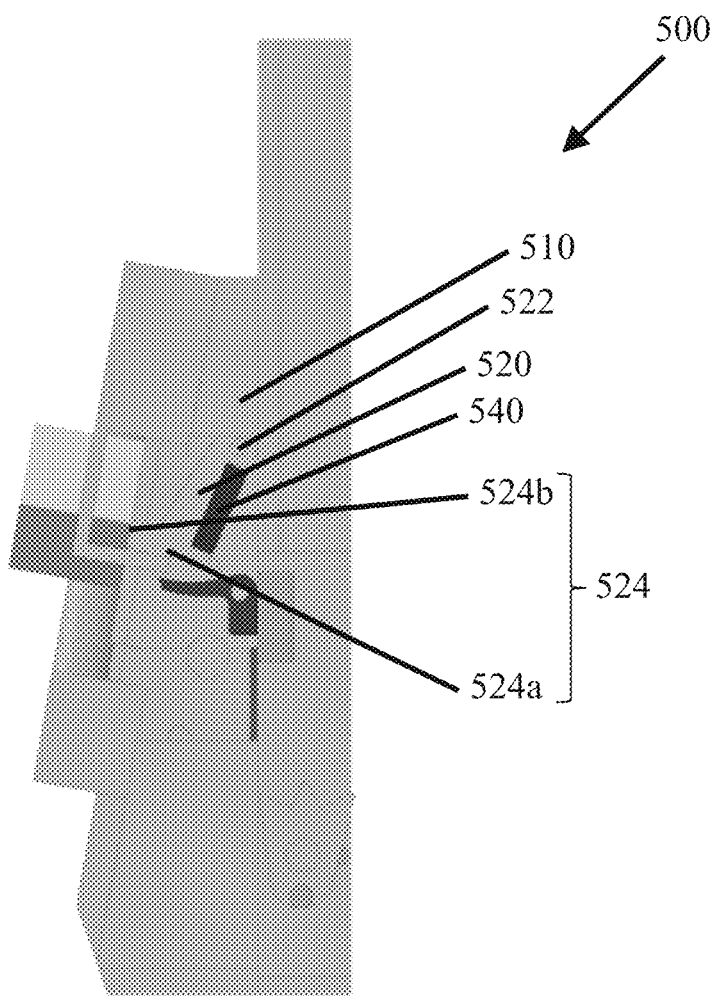
Figure 58:
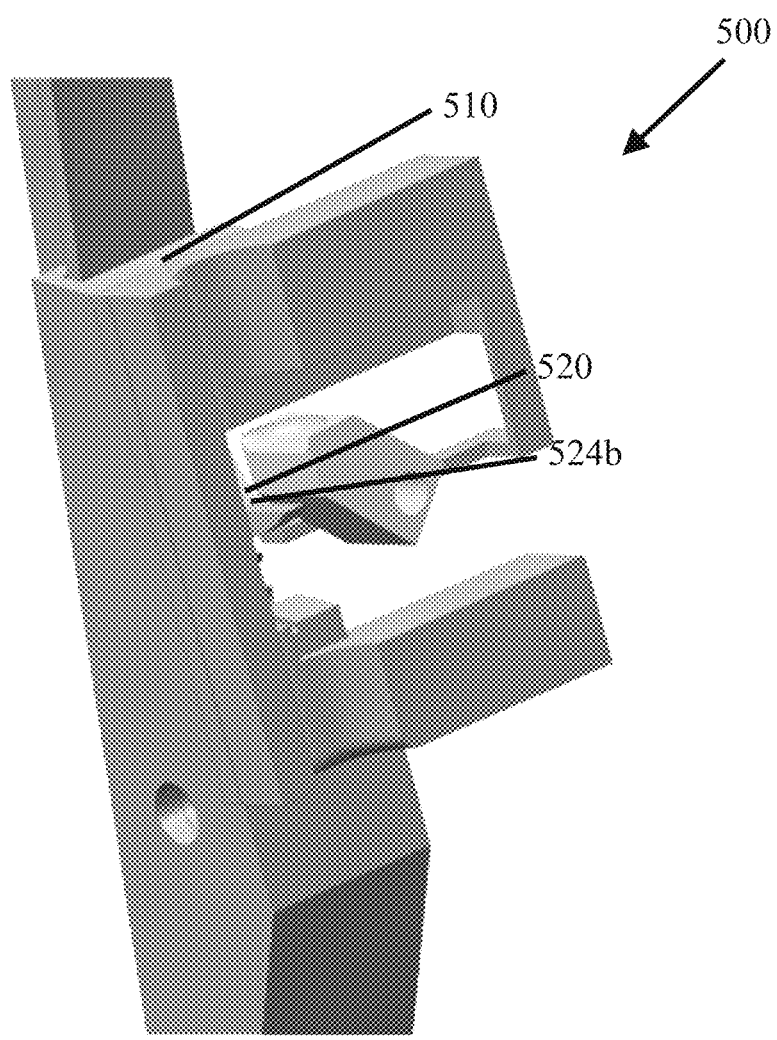
Figure 59:
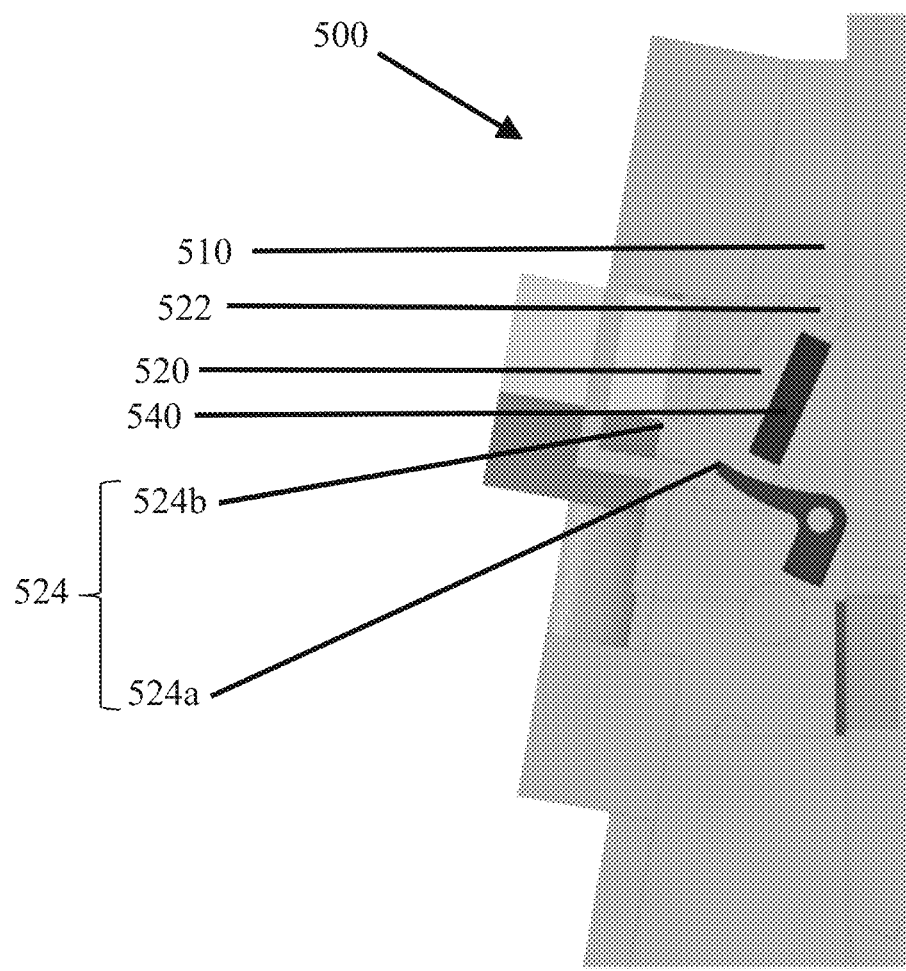
Figure 60:
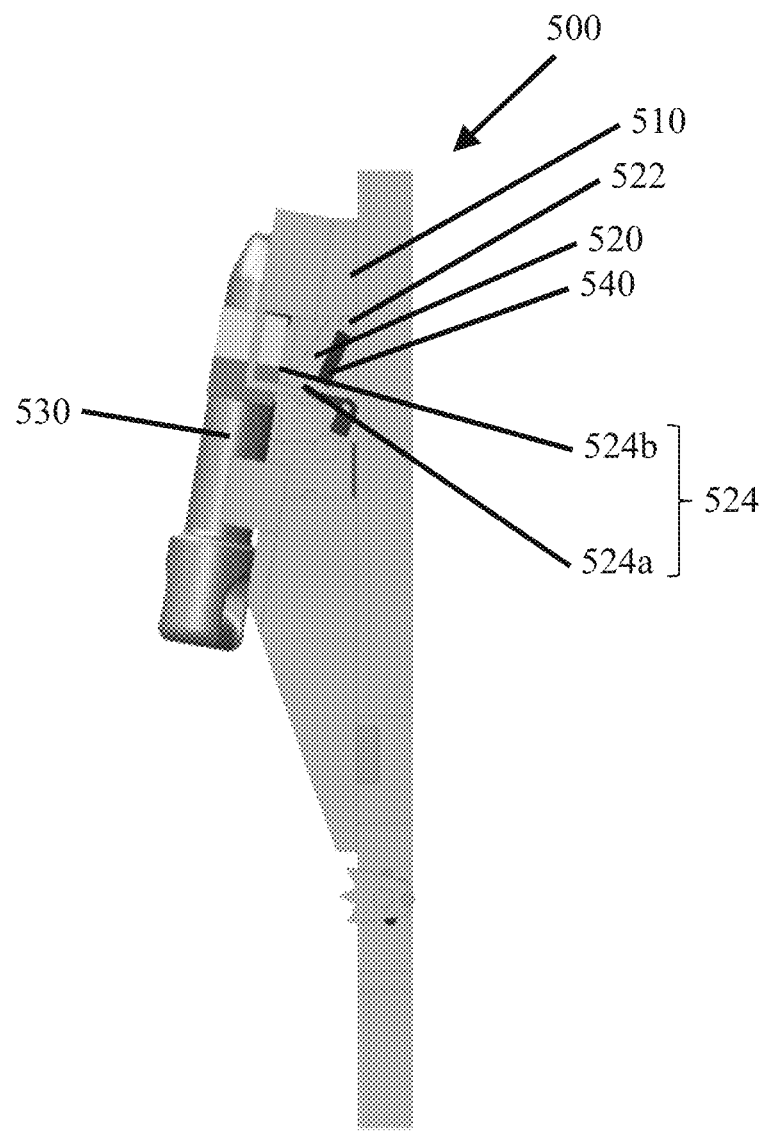
Figure 61:
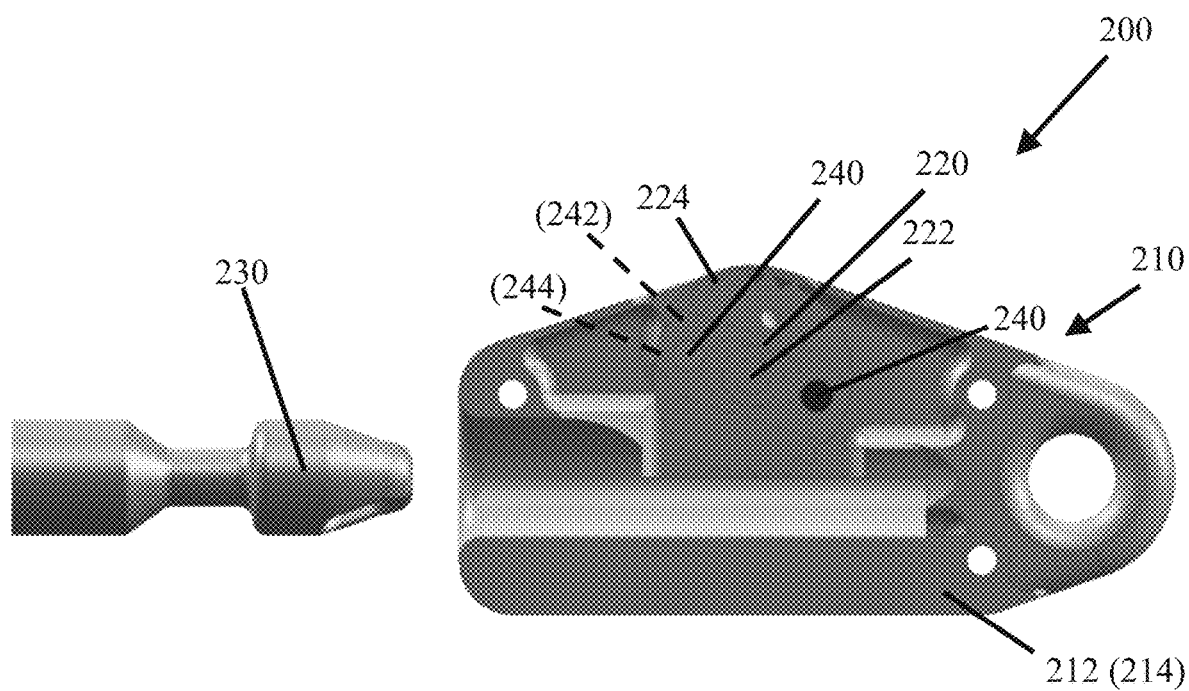
FIGS. 61-68 include views of a single rotating flipper locking mechanism according to embodiments of the present disclosure.
Figure 62:
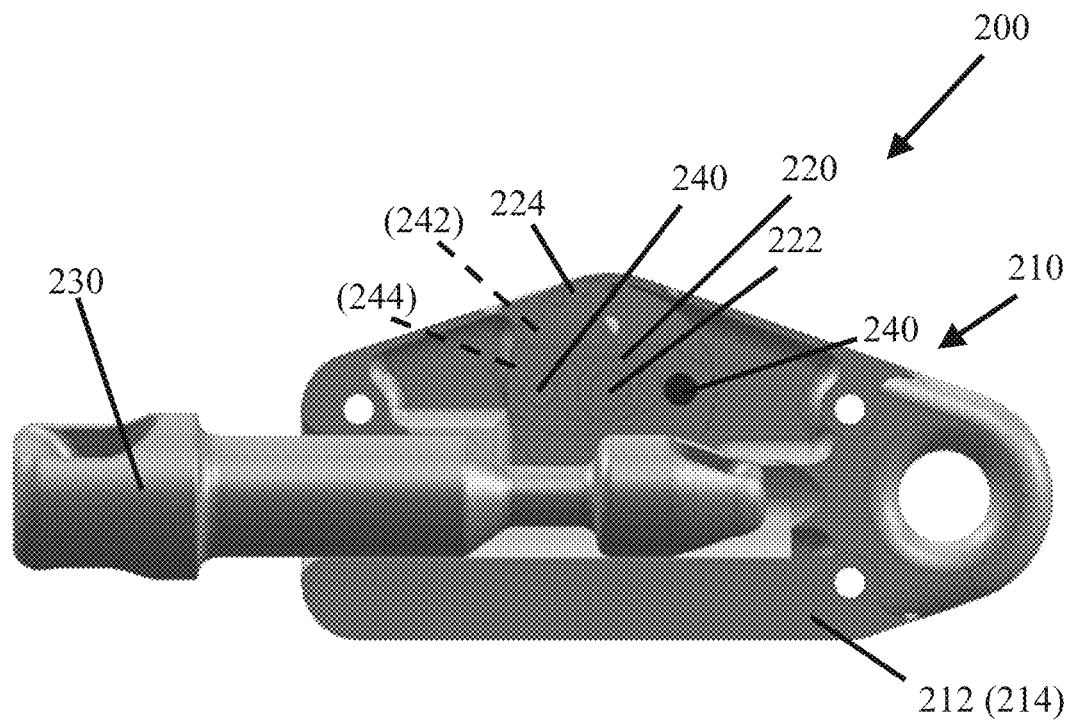

Once the slug 530 is disengaged, the headboard device is lowered, causing the upstop to move to the second upstop position, whereby movement of the headboard device is stopped in the down direction to unlock the halyard (see FIG. 53). As with unlocking the slug 530, when the sail is hoisted into its locking system inside the headboard device, its locking slug tends to push the Device up, preventing the locking slug from engaging the halyard locking system. The operation requires that the headboard device be held in position until the slug 530 is locked.

Next, the headboard device must be released to allow hoisting. To this end, the second upstop notch 524b stops movement of the headboard device to allow the slug 530 to be engaged in its locking system in the headboard device (see FIG. 54).

Once the slug 530 is locked in the locking system, the halyard is eased slightly, allowing the flipper (see FIG. 55) to move to its third (neutral) position, allowing the headboard device to be hoisted. When the sail is taken down, the operation is repeated.

While there have been shown and described illustrative embodiments that provide for various magnet-assisted automatic locking mechanisms, it is to be understood that other adaptations and modifications may be made within the spirit and scope of the embodiments herein. For example, it should be appreciated that the arrangement of the magnet assemblies—e.g., the positioning, the shape, the number, and the like of the magnets—described herein and shown in the figures is not limited thereto, but rather the disclosed arrangement is provided merely for demonstration purposes and provided as only a single embodiment of the claimed invention. Similarly, the positions (e.g., "neutral," "engaged," etc.) described herein are not limited to the snapshots shown in the figures, as it should be appreciated that, for example, the exact position of the lock components may vary within a given mechanism. Instead, the present disclosure is limited only by the claims set forth herein. Therefore, the disclosed embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A double rotating flipper locking mechanism for maintaining tension on a halyard, the double rotating flipper locking mechanism comprising:
   a housing having an internal space and configured to receive a slug that moves along a path through the housing, the slug being operably connected to the halyard, the housing including a first housing side and a second housing side coupled to one another;
   first and second flippers rotatably disposed in the housing, the first and second flippers configured to rotate between at least a cocked position in which the slug is inserted into the housing, a locked position in which a surface of the first and second flippers receive the slug and impede the slug from exiting the housing along the path, wherein the halyard is tensioned in the locked position, and a neutral position in which the first and second flippers allow movement of the slug; and a magnet assembly configured to effect rotation of the first and second flippers, the magnet assembly including at least: first and second housing magnets disposed within the first housing side, third and fourth housing magnets disposed within the second housing side, first and second flipper magnets disposed within the first flipper, and third and fourth flipper magnets disposed within the second flipper.

2. A single rotating flipper locking mechanism for maintaining tension on a halyard, the single rotating flipper locking mechanism comprising:

a housing having an internal space and configured to receive a slug that moves along a path through the housing, the slug being operably connected to the halyard, the housing including a first housing side and a second housing side coupled to one another;

a flipper rotatably disposed in the housing, the flipper configured to rotate between at least a cocked position in which the slug is inserted into the housing, a locked position in which a surface of the flipper receives the slug and impedes the slug from exiting the housing along the path, wherein the halyard is tensioned in the locked position, and a neutral position in which the flipper allows movement of the slug; and a magnet assembly configured to effect rotation of the flipper, the magnet assembly including at least: a first housing magnet disposed within the first housing side, a second housing magnet disposed within the second housing side, and first and second flipper magnets disposed within the flipper.

3. An alternating direction flipper locking mechanism for locking a headboard device of a sailing vessel, the alternating direction flipper locking mechanism comprising:

a housing having at least one track along which the headboard device travels in an upward and downward direction;

a flipper rotatably disposed in the housing, the flipper having a notch formed therein, the flipper configured to rotate between at least a neutral position in which the flipper allows movement of the headboard device, a cocked position in which the headboard device travels upward past the flipper, and a locked position in which the notch of the flipper receives the headboard device and impedes the headboard device from downwardly exiting the housing; and a magnet assembly configured to effect rotation of the flipper, the magnet assembly including at least four housing magnets disposed within the housing and a first flipper magnet disposed within the flipper, three of the at least four housing magnets having a polarity that is opposite a polarity of the first flipper magnet, and one of the at least four housing magnets having a polarity that is the same as the polarity of the first flipper magnet.

4. A magnetic unlock prevention mechanism for preventing a halyard lock from unlocking, the magnetic unlock prevention mechanism comprising:

a housing having at least one track along which a headboard device of a sailing vessel travels in an upward and downward direction;

first and second flippers rotatably disposed in the housing, the first and second flippers in continuous contact with each other such that rotation of the first flipper effects rotation of the second flipper, the first and second flippers configured to rotate between at least an a stowed position in which the first and second flippers are stowed, an unlock preventing position in which the halyard lock travels upward past the first and second flippers, such that unlocking of the halyard lock is prevented, and a disengaged position in which the first and second flippers allow the unlocking of the halyard lock; and a magnet assembly configured to effect rotation of the flipper, the magnet assembly including at least a first housing magnet disposed within the housing, a first flipper magnet disposed within the first flipper, and a second flipper magnet disposed within the second flipper, the first and second flipper magnets having a polarity that is opposite a polarity of the first housing magnet.

5. An automatic upstop locking mechanism for locking a headboard device of a sailing vessel, the automatic upstop locking mechanism comprising:

a housing having at least one track along which the headboard device travels in an upward and downward direction;

a flipper rotatably disposed in the housing, the flipper configured to rotate between at least a neutral position in which upward and downward movement of the headboard device is permitted, an unlocked position in which upward movement of the headboard device is prevented to unlock a halyard, and a locked position in which upward movement of the headboard device is prevented to lock the halyard; and a magnet assembly configured to effect rotation of the flipper, the magnet assembly including at least five housing magnets disposed within the housing and a first flipper magnet disposed within the flipper, three of the five housing magnets having a polarity that is opposite a polarity of the first flipper magnet, and two of the five housing magnets having a polarity that is the same as the polarity of the first flipper magnet.

6. The double rotating flipper locking mechanism of claim 1, wherein each of the first and second flippers is configured to rotate at least 180 degrees.

7. The double rotating flipper locking mechanism of claim 6, wherein each of the first and second flippers is configured to rotate at least 270 degrees.

8. The double rotating flipper locking mechanism of claim 1, wherein an end of each of the first and second flippers is configured to rotate into a notch in the slug.

9. The double rotating flipper locking mechanism of claim 1, wherein the first flipper includes a first toothed gear, the second flipper includes a second toothed gear, and the first toothed gear is configured to engage with the second toothed gear.

10. The double rotating flipper locking mechanism of claim 1,
wherein an end of each of the first and second flippers is configured to rotate into a notch in the slug,
wherein the first flipper includes a first toothed gear, the second flipper includes a second toothed gear, and the first toothed gear is configured to engage with the second toothed gear, and
wherein the double rotating flipper locking mechanism is configured so that the end of each of the first and second flippers is rotated into the notch in the slug when the first toothed gear is disengaged with the second toothed gear.

11. The double rotating flipper locking mechanism of claim 1, wherein the halyard comprises a synthetic polymer.

12. The single rotating flipper locking mechanism of claim 2, wherein each of the first and second flippers is configured to rotate at least 180 degrees.

13. The single rotating flipper locking mechanism of claim 12, wherein each of the first and second flippers is configured to rotate at least 270 degrees.

14. The single rotating flipper locking mechanism of claim 2, wherein an end of each of the first and second flippers is configured to rotate into a notch in the slug.

15. The double rotating flipper locking mechanism of claim 2, wherein the halyard comprises a synthetic polymer.

16. The alternating direction flipper locking mechanism of claim 3,
 wherein the neutral position includes one position at approximately 90° or two positions at 60° with respect to the direction of the headboard device,
 wherein the cocked position includes one position at approximately 20° with respect to the direction of the headboard device, and
 wherein the locked position includes one position at approximately 45° with respect to the direction of the headboard device.

17. The magnetic unlock prevention mechanism of claim 4, wherein the first flipper is an unlock preventing flipper, and the second flipper is a stop flipper.

18. The magnetic unlock prevention mechanism of claim 17,
 wherein the unlock preventing flipper includes a curved, convex, notched cam surface; wherein the stop flipper includes a curved, concave cam surface,
 wherein the curved, convex, notched cam surface is configured to engage with the curved, concave cam surface, and
 wherein the curved, convex, notched cam surface is configured to engage with an end of the stop flipper.

19. The automatic upstop locking mechanism of claim 5, wherein the flipper includes a first upstop notch and a second upstop notch.

20. The automatic upstop locking mechanism of claim 19,
 wherein the flipper includes a curved, convex cam surface,
 wherein the curved, convex cam surface includes the first upstop notch,
 wherein the flipper includes an opposed cam surface opposed to the curved, convex cam surface, and
 wherein the opposed cam surface includes the second upstop notch.

* * * * *